US011863286B2

(12) United States Patent
Nam et al.

(10) Patent No.: US 11,863,286 B2
(45) Date of Patent: Jan. 2, 2024

(54) EFFICIENT RECONFIGURABLE INTELLIGENT SURFACE OR REPEATER ASSISTED COMMUNICATION

(71) Applicant: QUALCOMM Incorporated, San Diego, CA (US)

(72) Inventors: Wooseok Nam, San Diego, CA (US); Yucheng Dai, San Diego, CA (US); Tao Luo, San Diego, CA (US); Peter Gaal, San Diego, CA (US); Junyi Li, Fairless Hills, PA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/448,019

(22) Filed: Sep. 17, 2021

(65) Prior Publication Data
US 2023/0086052 A1 Mar. 23, 2023

(51) Int. Cl.
*H04B 7/155* (2006.01)
(52) U.S. Cl.
CPC .................. *H04B 7/155* (2013.01)
(58) Field of Classification Search
CPC ........... H04W 72/042; H04W 72/0446; H04W 24/02; H04W 72/0453; H04W 72/1289; H04L 5/0053; H04L 1/1812; H04B 7/0617; H04B 7/145; H04B 7/0695; H04B 7/0413; H04B 7/0626; H04B 7/0456
See application file for complete search history.

(56) References Cited

U.S. PATENT DOCUMENTS

2018/0035263 A1* 2/2018 Titus ...................... H04W 4/35
2022/0322321 A1* 10/2022 Dai ..................... H04L 41/0813

FOREIGN PATENT DOCUMENTS

| CN | 111093267 A | 5/2020 |
| WO | 2021179965 A1 | 9/2021 |
| WO | 2021196950 A1 | 10/2021 |
| WO | WO-2022211388 A1 * | 10/2022 |

OTHER PUBLICATIONS

Hussein et al. "Reconfigurable intelligent surface index modulation with signature constellations"; (pp. 1-5), (conference date Mar. 29, 2021-Apr. 1, 2021, added to IEEE Xplore, May 5, 2021) (Year: 2021).*

(Continued)

*Primary Examiner* — Khalid W Shaheed
(74) *Attorney, Agent, or Firm* — Harrity & Harrity, LLP

(57) ABSTRACT

Various aspects of the present disclosure generally relate to wireless communication. In some aspects, a user equipment (UE) may receive a signal that is transmitted by a base station with a modulation signature associated with a reconfigurable intelligent surface (RIS) or a repeater and redirected by the RIS or the repeater using modulation that reverses the modulation signature associated with the RIS or the repeater. The UE may decode the signal, wherein the signal is decodable by the UE based at least in part on the signal being redirected by the RIS or the repeater using the modulation that reverses the modulation signature associated with the RIS or the repeater. Numerous other aspects are described.

30 Claims, 15 Drawing Sheets

(56) References Cited

OTHER PUBLICATIONS

Dajer et al. "Reconfigurable intelligent surface: design the channel—a new opportunity for future wireless networks", pp. 87-104 (Year: 2021).*
International Search Report and Written Opinion—PCT/US2022/076174—ISA/EPO—dated Nov. 29, 2022.
Mahindra R., et al., "Radio Access Network Sharing in Cellular Networks", 2013 21st IEEE International Conference on Network Protocols (ICNP), IEEE, Oct. 7, 2013, pp. 1-10, XP032563789, DOI: 10.1109/ICNP.2013.6733595 [retrieved on Feb. 6, 2014] the whole document.

* cited by examiner

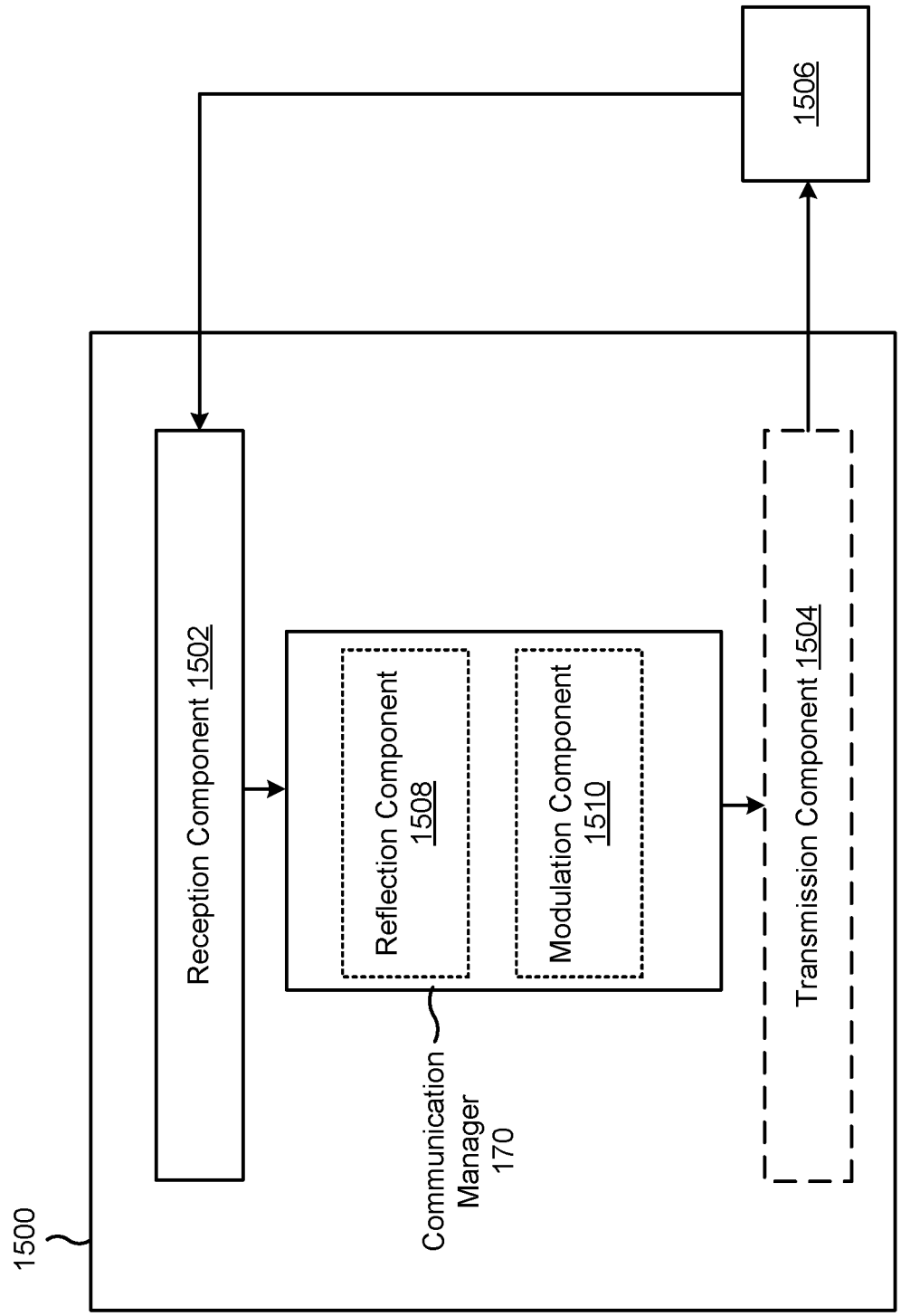

EFFICIENT RECONFIGURABLE INTELLIGENT SURFACE OR REPEATER ASSISTED COMMUNICATION

FIELD OF THE DISCLOSURE

Aspects of the present disclosure generally relate to wireless communication and to techniques and apparatuses for efficient reconfigurable intelligent surface (RIS) or repeater assisted communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive a signal that is transmitted by a base station with a modulation signature associated with a reconfigurable intelligent surface (RIS) or a repeater and redirected by the RIS or the repeater using modulation that reverses the modulation signature associated with the RIS or the repeater. The one or more processors may be configured to decode the signal, wherein the signal is decodable by the UE based at least in part on the signal being redirected by the RIS or the repeater using the modulation that reverses the modulation signature associated with the RIS or the repeater.

Some aspects described herein relate to a base station for wireless communication. The base station may include a memory and one or more processors coupled to the memory. The one or more processors may be configured to transmit a first signal using a modulation signature associated with an RIS or a repeater, wherein the RIS or the repeater redirects the first signal and reverses the modulation signature. The one or more processors may be configured to transmit a second signal without using the modulation signature associated with the RIS or the repeater.

Some aspects described herein relate to an RIS for wireless communication. The reconfigurable intelligent surface may include a memory and one or more processors coupled to the memory. The one or more processors may be configured to receive, from a base station, a first signal modulated by a modulation signature associated with the RIS. The one or more processors may be configured to redirect the first signal using modulation that reverses the modulation signature associated with the RIS.

Some aspects described herein relate to a method of wireless communication performed by a UE. The method may include receiving a signal that is transmitted by a base station with a modulation signature associated with an RIS or a repeater and redirected by the RIS or the repeater using modulation that reverses the modulation signature associated with the RIS or the repeater. The method may include decoding the signal, wherein the signal is decodable by the UE based at least in part on the signal being redirected by the RIS or the repeater using the modulation that reverses the modulation signature associated with the RIS or the repeater.

Some aspects described herein relate to a method of wireless communication performed by a base station. The method may include transmitting a first signal using a modulation signature associated with an RIS or a repeater, wherein the RIS or the repeater redirects the first signal and reverses the modulation signature. The method may include transmitting a second signal without using the modulation signature associated with the RIS or the repeater.

Some aspects described herein relate to a method of wireless communication performed by an RIS. The method may include receiving, from a base station, a first signal modulated by a modulation signature associated with the RIS. The method may include redirecting the first signal using modulation that reverses the modulation signature associated with the RIS.

Some aspects described herein relate to a non-transitory computer-readable medium that stores a set of instructions for wireless communication by a UE. The set of instructions, when executed by one or more processors of the UE, may cause the UE to receive a signal that is transmitted by a base station with a modulation signature associated with an RIS or a repeater and redirected by the RIS or the repeater using modulation that reverses the modulation signature associated with the RIS or the repeater. The set of instructions, when executed by one or more processors of the UE, may cause the UE to decode the signal, wherein the signal is decodable by the UE based at least in part on the signal being redirected by the RIS or the repeater using the modulation that reverses the modulation signature associated with the RIS or the repeater.

Some aspects described herein relate to a non-transitory computer-readable medium that stores a set of instructions for wireless communication by a base station. The set of instructions, when executed by one or more processors of the base station, may cause the base station to transmit a first signal using a modulation signature associated with an RIS or a repeater, wherein the RIS or the repeater redirects the first signal and reverses the modulation signature. The set of instructions, when executed by one or more processors of the base station, may cause the base station to transmit a second signal without using the modulation signature associated with the RIS or the repeater.

Some aspects described herein relate to a non-transitory computer-readable medium that stores a set of instructions for wireless communication by an RIS. The set of instructions, when executed by one or more processors of the RIS, may cause the RIS to receive, from a base station, a first signal modulated by a modulation signature associated with the RIS. The set of instructions, when executed by one or more processors of the RIS, may cause the RIS to redirect the first signal using modulation that reverses the modulation signature associated with the RIS.

Some aspects described herein relate to an apparatus for wireless communication. The apparatus may include means for receiving a signal that is transmitted by a base station with a modulation signature associated with an RIS or a repeater and redirected by the RIS or the repeater using modulation that reverses the modulation signature associated with the RIS or the repeater. The apparatus may include means for decoding the signal, wherein the signal is decodable based at least in part on the signal being redirected by the RIS or the repeater using the modulation that reverses the modulation signature associated with the RIS or the repeater.

Some aspects described herein relate to an apparatus for wireless communication. The apparatus may include means for transmitting a first signal using a modulation signature associated with an RIS or a repeater, wherein the RIS or the repeater redirects the first signal and reverses the modulation signature. The apparatus may include means for transmitting a second signal without using the modulation signature associated with the RIS or the repeater.

Some aspects described herein relate to an apparatus for wireless communication. The apparatus may include means for receiving, from a base station, a first signal modulated by a modulation signature. The apparatus may include means for redirecting the first signal using modulation that reverses the modulation signature.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 13-15 are diagrams of example apparatuses for wireless communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
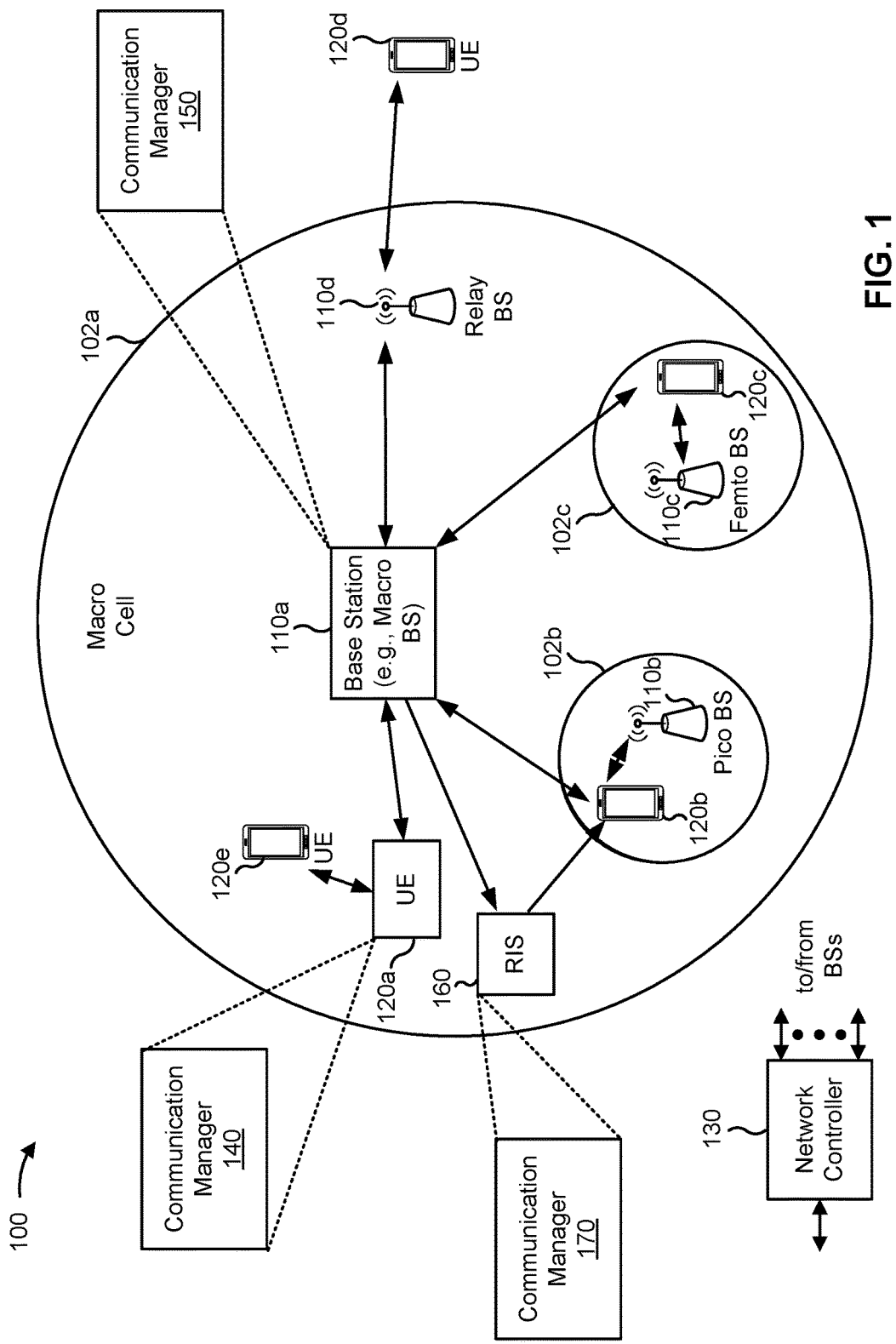
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a signal that is transmitted by a base station with a modulation signature associated with a reconfigurable intelligent surface (RIS) or a repeater and redirected by the RIS or the repeater using modulation that reverses the modulation signature associated with the RIS or the repeater; and decode the signal, wherein the signal is decodable by the UE based at least in part on the signal being redirected by the RIS or the repeater using the modulation that reverses the signature associated with the RIS or the repeater. Additionally, or alternatively, the communication manager 140 may perform one or more other operations described herein.

In some aspects, the base station 110 may include a communication manager 150. As described in more detail elsewhere herein, the communication manager 150 may transmit a first signal using a modulation signature associated with an RIS or a repeater, wherein the RIS or the repeater redirects the first signal and reverses the modulation signature; and transmit a second signal without using the modulation signature associated with the RIS or the repeater. Additionally, or alternatively, the communication manager 150 may perform one or more other operations described herein.

As shown in FIG. 1, the wireless network 100 may include an RIS 160. The RIS 160 may include a communication manager 170. The RIS 160 may include one or more reconfigurable elements capable of redirecting or reflecting signals transmitted by a base station 110 or a UE 120.

In some aspects, as described in more detail elsewhere herein, the communication manager 170 of the RIS 160 may receive, from a base station, a first signal modulated by a modulation signature associated with the RIS 160; and redirect the first signal using modulation that reverses the modulation signature associated with the RIS. Additionally, or alternatively, the communication manager 170 may perform one or more other operations described herein.

As indicated above, FIG. 1 is provided as an example. Other examples may differ from what is described with regard to FIG. 1.

Figure 2:
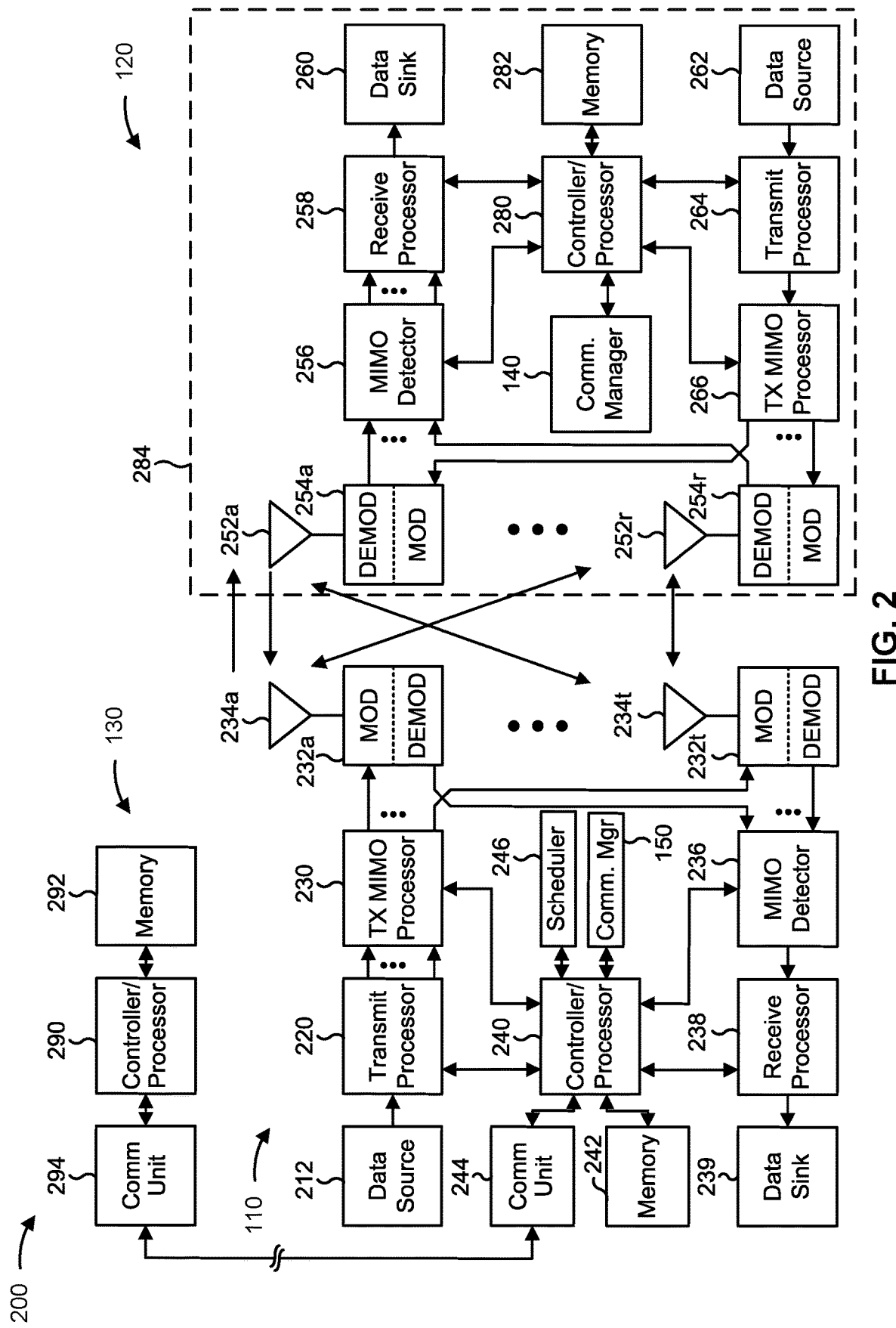
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-15).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-15).

The controller/processor 240 of the base station 110, the controller/processor 280 of the UE 120, and/or any other component(s) of FIG. 2 may perform one or more techniques associated with efficient RIS-assisted communication, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for receiving a signal that is transmitted by a base station with a modulation signature associated with an RIS or a repeater and redirected by the RIS or the repeater using modulation that reverses the modulation signature associated with the RIS or the repeater; and/or means for decoding the signal, wherein the signal is decodable by the UE based at least in part on the signal being redirected by the RIS or the repeater using the modulation that reverses the signature associated with the RIS or the repeater. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a first signal using a modulation signature associated with an RIS or a repeater, wherein the RIS or the repeater redirects the first signal and reverses the modulation signature; and/or means for transmitting a second signal without using the modulation signature associated with the RIS or the repeater. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an RIS includes means for receiving, from a base station, a first signal modulated by a modulation signature associated with the RIS; and/or means for redirecting the first signal using modulation that reverses the modulation signature associated with the RIS. In some aspects, the means for the RIS to perform operations described herein may include, for example, one or more of communication manager 170, a transmit processor, an antenna, a modem, a receive processor, a controller/processor, a memory, and/or one or more reconfigurable elements.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
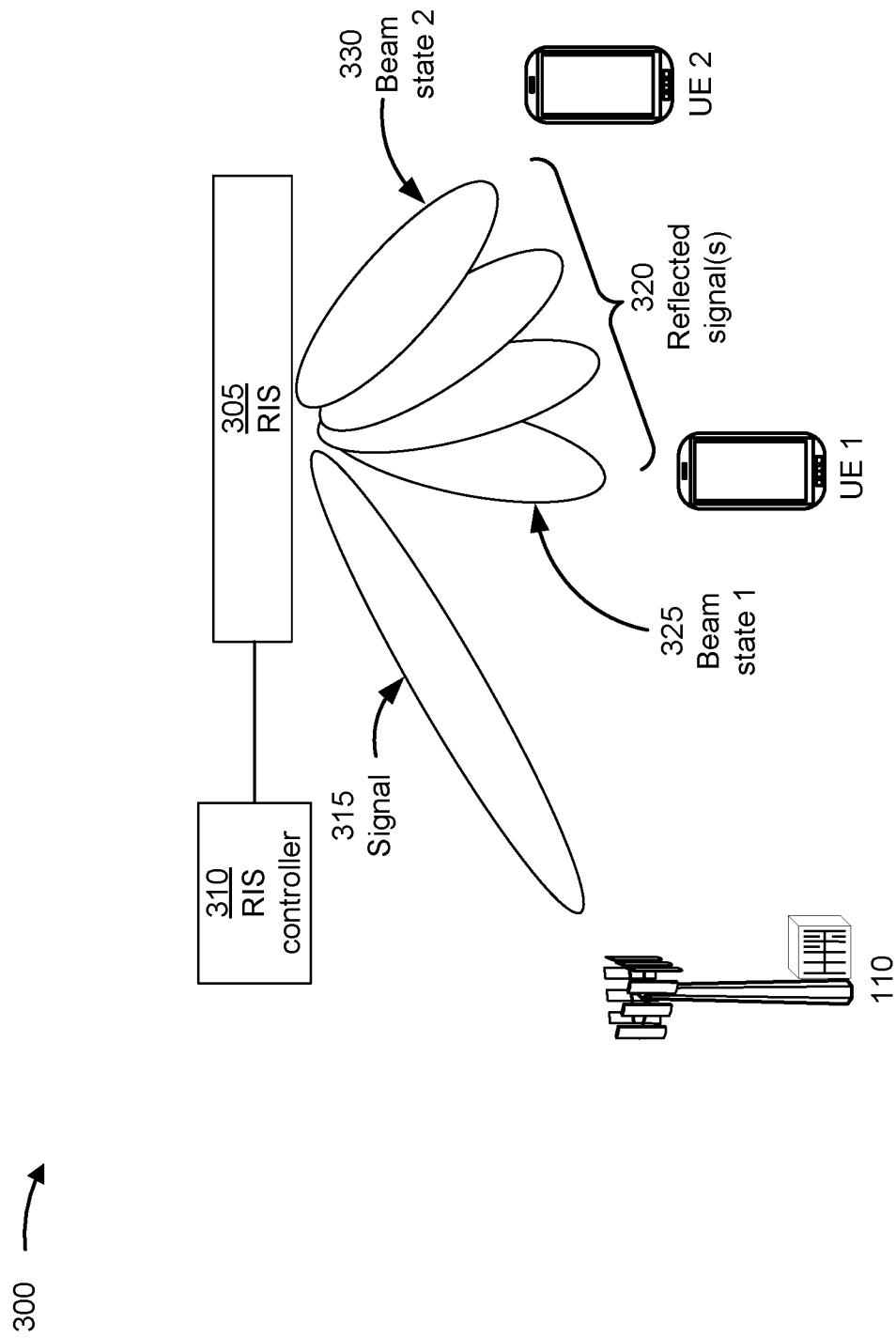
FIG. 3 is a diagram illustrating an example of communications using a reconfigurable intelligent surface (RIS), in accordance with the present disclosure.

FIG. 3 is a diagram illustrating an example 300 of communications using an RIS, in accordance with the present disclosure. As shown in FIG. 3, a base station 110 may communicate with a UE 120 in a wireless network, such as the wireless network 100. The base station 110 and the UE 120 may use an RIS 305 to communicate with one another. For example, the RIS 305 may reflect or redirect a signal to the base station 110 and/or the UE 120. The RIS 305 may also be referred to as an intelligent reflecting surface. In some examples, the RIS 305 may be a repeater.

The RIS 305 may be, or may include, a planar or two-dimensional structure or surface that is designed to have properties to enable a dynamic control of signals or electromagnetic waves reflected and/or redirected by the RIS 305. The RIS 305 may include one or more reconfigurable elements. For example, the RIS 305 may include an array of reconfigurable elements (e.g., an array of uniformly distributed reconfigurable elements). The reconfigurable elements may be elements with a reconfigurable electromagnetic characteristic. For example, the electromagnetic characteristic may include a reflection characteristic (e.g., a reflection coefficient), a scattering characteristic, an absorption characteristic, and/or a diffraction characteristic. The electromagnetic characteristic(s) of each reconfigurable element may be independently controlled and changed over time. The electromagnetic characteristic(s) of each reconfigurable element may be independently configured such that the combination of configured states of the reconfigurable elements reflects an incident signal or waveform in a controlled manner. For example, the reconfigurable elements may be configured to reflect or redirect an impinging signal in a controlled manner, such as by reflecting the impinging signal in a desired direction, with a desired beam width, with a desired phase, with a desired amplitude, and/or with a desired polarization, among other examples. In other words, the RIS 305 may be capable of modifying one or more properties (e.g., direction, beam width, phase, amplitude, and/or polarization) of an impinging signal.

The reconfigurable elements of the RIS 305 may be controlled and/or configured by an RIS controller 310. The RIS controller 310 may be a control module (e.g., a controller and/or a processor) that is capable of configuring the electromagnetic characteristic(s) of each reconfigurable element of the RIS 305. The RIS controller 310 may be, or may be included in, the communication manager 170. Alternatively, the communication manager 170 may be included in the RIS controller 310. The RIS controller 310 may receive control communications (e.g., from a base station 110 and/or a UE 120) indicating one or more properties of reflected signals (e.g., indicating a desired direction, a desired beam width, a desired phase, a desired amplitude, and/or a desired polarization). Therefore, in some examples, the RIS 305 may be capable of receiving communications (e.g., via the RIS 305 and/or the RIS controller 310). In some examples, the RIS 305 and/or the RIS controller 310 may not have transmit capabilities (e.g., the RIS 305 may be capable of reflecting and/or redirecting impinging signals, via the reconfigurable elements, and modifying the reflected signals, but may not be capable of generating and/or transmitting signals). Due to the capability of the RIS 305 to receive communications (e.g., via the RIS 305 and/or the RIS controller 310), the RIS 305 may recover partial synchronization with other wireless communication nodes (e.g., a base station 110 and/or a UE 120). For example, the RIS 305 may acquire and track a frame structure (e.g., downlink or uplink frame structure) and/or slot or symbol boundaries, among other examples.

As shown in FIG. 3, the base station 110 may transmit a signal 315. The signal 315 may be transmitted in a spatial direction toward the RIS 305. The RIS controller 310 may configure the reconfigurable elements of the RIS 305 to reflect and/or redirect the signal 315 in a desired spatial direction and/or with one or more desired signal characteristics (e.g., beam width, phase, amplitude, frequency, and/or polarization). For example, as shown by reference number 320, the RIS 305 may be capable of reflecting the signal 315 in one or more spatial directions. Although multiple beams are shown in FIG. 3 representing different beam states or beam directions of the RIS 305, the RIS 305 may be capable of reflecting a signal with one beam state or one beam direction at a time. For example, in one case, as shown by reference number 325, the RIS 305 may be configured to reflect the signal 315 using a first beam state (e.g., beam state 1). "Beam state" may refer to a spatial direction and/or a beam of a reflected signal (e.g., a signal reflected by the RIS 305). The first beam state may cause the signal 315 to be reflected in a spatial direction toward a first UE 120 (e.g., UE 1). As shown by reference number 330, in another case, the RIS 305 may be configured to reflect the signal 315 using a second beam state (e.g., beam state 2). The second beam state may cause the signal 315 to be reflected in a spatial direction toward a second UE 120 (e.g., UE 2).

The RIS 305 may be deployed in a wireless network (such as the wireless network 100) to improve communication performance and efficiency. For example, the RIS 305 may enable a transmitter (e.g., a base station 110 or a UE 120) to control the scattering, reflection, and refraction characteristics of signals transmitted by the transmitter, to overcome the negative effects of wireless propagation. For example, the RIS 305 may effectively control signal characteristics (e.g., spatial direction, beam width, phase, amplitude, frequency, and/or polarization) of an impinging signal without a need for complex decoding, encoding, and radio frequency processing operations. Therefore, the RIS 305 may provide increased channel diversity for propagation of signals in a wireless network. The increased channel diversity provides robustness to channel fading and/or blocking, such as when higher frequencies are used by the base station 110 and/or the UE 120 (e.g., millimeter wave frequencies and/or sub-terahertz frequencies). Moreover, as the RIS 305 does not need to perform complex decoding, encoding, and radio frequency processing operations, the RIS 305 may provide a more cost and energy efficient manner of reflecting and/or redirecting signals in a wireless network (e.g., as compared to other mechanisms for reflecting and/or redirecting signals, such as a relay device).

As indicated above, FIG. 3 is provided as an example. Other examples may differ from what is described with respect to FIG. 3.

Figure 4:
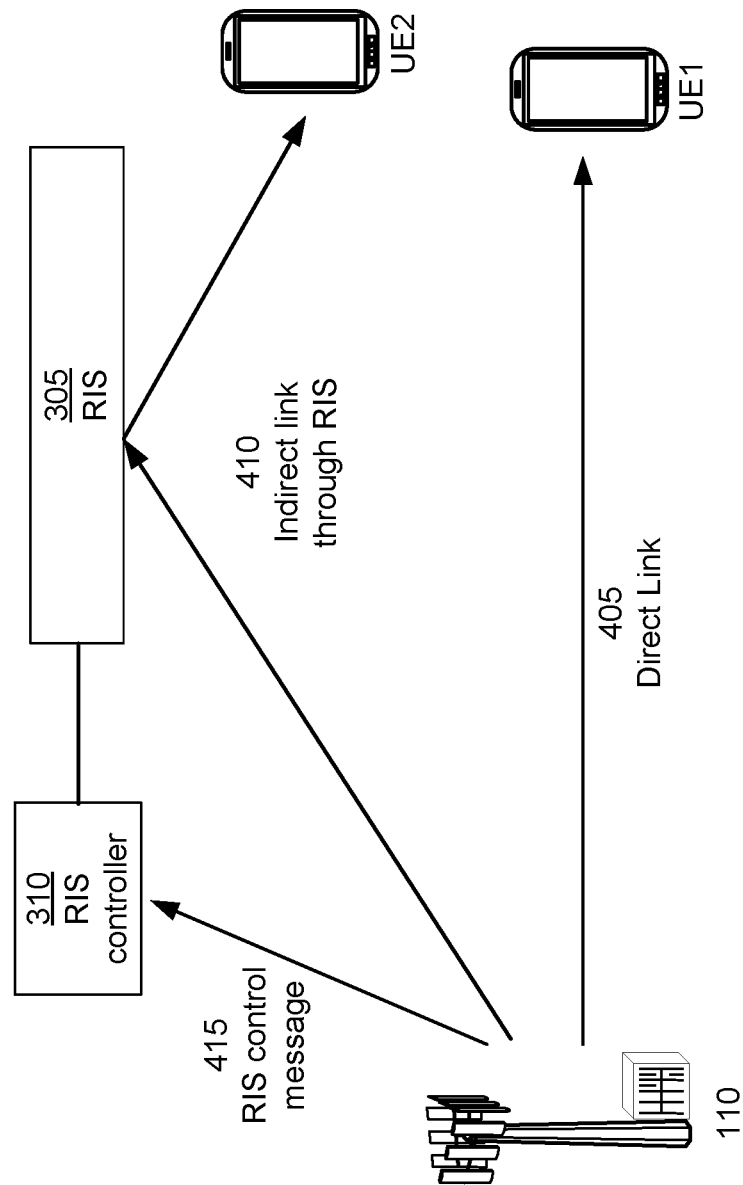
FIG. 4 is a diagram illustrating an example of communication links in a wireless network that includes an RIS, in accordance with the present disclosure.

FIG. 4 is a diagram illustrating an example 400 of communication links in a wireless network that includes an RIS, in accordance with the present disclosure. As shown, example 400 includes a base station 110, a first UE 120 (e.g., UE 1), a second UE 120 (e.g., UE 2), and the RIS 305. The RIS 305 may be controlled and/or configured by the RIS controller 310.

As shown in FIG. 4, some UEs 120, such as UE 1), may receive a communication (e.g., data and/or control information) directly from the base station 110 as a downlink communication. Additionally, or alternatively, some UEs 120, such as UE 2, may receive a communication (e.g., data and/or control information) indirectly from the base station 110 via the RIS 305. For example, the base station 110 may transmit the communication in a spatial direction toward the RIS 305, and the RIS 305 may redirect or reflect the communication to UE 2.

In some examples, UE 1 may communicate directly with the base station 110 via a direct link 405. For example, a communication may be transmitted via the direct link 405. A communication transmitted via the direct link 405 between UE 1 and the base station 110 does not pass through and is not reflected or redirected by the RIS 305. In some examples, UE 2 may communicate indirectly with the base station 110 via an indirect link 410. For example, a communication may be transmitted via different segments of the indirect link 410. In some cases, the base station 110 may establish indirect links 410 through the RIS 305 with one or more UEs 120 out of a coverage area of the base station 110 and/or with one or more UEs for which a direct link 405 is blocked by an obstacle. A communication transmitted via the indirect link 410 between UE 2 and the base station 110 is reflected and/or redirected by the RIS 305. As shown in FIG. 4 and by reference number 415, the base station 110 may communicate with the RIS 305 (e.g., with the RIS controller 310) via a control channel. For example, the base station 110 may indicate, in an RIS control message, spatial direction(s) and/or signal characteristics for signals reflected by the RIS 305. The RIS controller 310 may configure reconfigurable elements of the RIS 305 in accordance with the RIS control message. In some examples, the RIS control message may indicate information associated with the wireless network, such as a frame structure (e.g., uplink or downlink frame structure), time synchronization information, and/or slot (and/or symbol) boundaries, among other examples. For example, the base station 110 may transmit the RIS control message to the RIS controller 310 and data to UE 2 via the indirect link 410. The RIS control message may be received by the RIS controller 310 and terminated at the RIS 305 (e.g., not delivered to UE 2). The RIS control message may indicate, to the RIS controller 310, a configuration of the RIS 305 for a desired state (e.g., reflection angle) that enables the data reflected and/or redirected by the RIS 305 to be reliably received by UE 2. Using the communication scheme shown in FIG. 4 may improve network performance and increase reliability by providing the UEs 120 with link diversity for communicating with the base station 110.

As indicated above, FIG. 4 is provided as an example. Other examples may differ from what is described with respect to FIG. 4.

Figure 5:
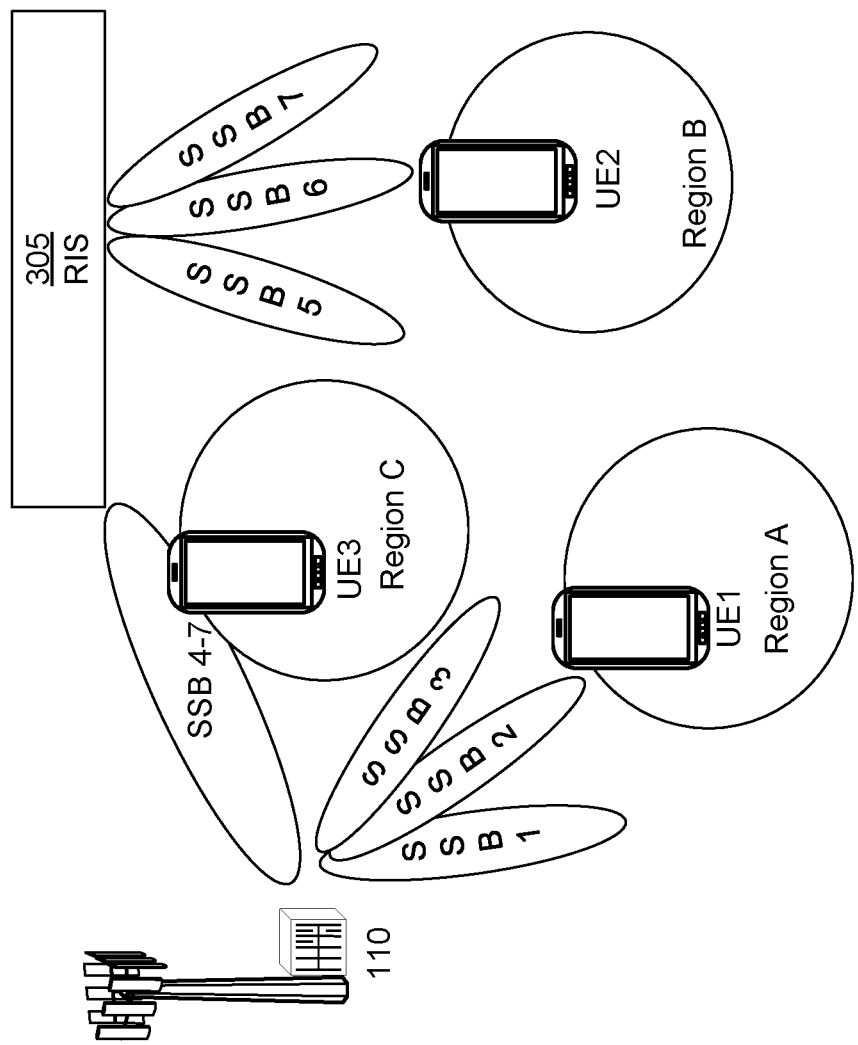
FIG. 5 is a diagram illustrating an example of synchronization signal block (SSB) transmission in a wireless network that includes an RIS, in accordance with the present disclosure.

FIG. 5 is a diagram illustrating an example 500 of SSB transmission in a wireless network that includes an RIS, in accordance with the present disclosure. As shown, example 500 includes a base station 110, a first UE 120 (e.g., UE 1), a second UE 120 (e.g., UE 2), a third UE 120 (e.g., UE 3), and the RIS 305.

The base station 110 may periodically transmit (e.g., broadcast) an SSB burst set that includes multiple SSBs. In some examples, different SSBs in an SSB burst set may be beam-formed differently (e.g., transmitted using different beams), and the SSBs may be used for initial cell search, cell acquisition, beam management, and/or beam selection (e.g., as part on an initial access procedure). An SSB may include a PSS, an SSS, and a physical broadcast channel (PBCH). A UE 120 may use the PSS to determine subframe/symbol timing of the base station 110 and to determine a physical layer identity. The UE may use the SSS to determine a physical layer cell identity group number and radio frame timing. The PBCH may carry a master information block (MIB) that provides system information for initial access (e.g., how to receive remaining minimum system information (RMSI)), as well as timing information including an SSB index. In some examples, the SSB index may correspond to a beam used to carry the SSB. A UE 120 may monitor for and/or measure SSBs using different receive (Rx) beams during an initial network access procedure and/or cell search procedure. The UE 120 may indicate one or more SSBs with a best signal parameter (e.g., an RSRP parameter) to the base station. The base station 110 and the UE 120 may use the one or more indicated SSBs to select one or more beams to be used for communication between the base station and the UE (e.g., for a random access channel (RACH) procedure). For example, the UE 120 may transmit a first message (e.g., Msg 1) of the RACH procedure to the base station 110 using a RACH resource associated with an SSB with the best signal parameter. Additionally, or alternatively, the UE 120 may use the SSB and/or the SSB index to determine a cell timing for a cell via which the SSB is received (e.g., a serving cell).

As shown in FIG. 5, the total SSB burst set, transmitted by the base station 110, may be partitioned into multiple sets of SSBs. For example, the SSB burst set may include a set of SSBs (e.g., SSB 1, SSB 2, SSB 3, and SSB 4) for direct transmission from the base station 110, and another set of SSBs (e.g., SSB 5, SSB, 6, and SSB 7) for transmission through the RIS 305. In some cases, if there are multiple RISs in a cell associated with the base station 110, there may be a respective set of SSBs dedicated for each RIS in the cell. The base station 110 may perform beam sweeping with the SSBs in the set of SSBs for direct transmission from the base station 110. For example, the base station 110 may transmit SSB 1, SSB 2, SSB 3, and SSB 4 on different beams having different beam directions. The RIS 305 may perform SSB beam sweeping on behalf of the base station 110 by changing the reflection state of the RIS 305 to redirect/reflect the SSBs in the set of SSBs for transmission through the RIS 305 at different reflection angles. For example, the base station 110 may transmit SSB 5, SSB 6, and SSB 7 on a beam directed towards the RIS 305, and the RIS 305 may redirect SSB 5, SSB 6, and SSB 7 at different reflection angles associated with different reflection states of the RIS 305.

As shown in FIG. 5, SSB 1, SSB 2, and SSB 3 may be used to serve UEs 120 in region A (e.g., UE 1). SSB 4 may be used to serve UEs 120 in region C (e.g., UE 3). SSB 5, SSB 6, and SSB 7 may be used to serve UEs 120 in region B (e.g., UE 2) through the RIS 305. In some examples, region B may be out of a coverage area of the base station 110. In some cases, an SSB (e.g., SSB 4) for direct transmission from the base station 110 may be transmitted, by the base station 110, in a same direction or in a similar direction as the set of SSBs (e.g., SSB 5, SSB 6, and SSB 7) for transmission through the RIS. For example, the base station 110 may transmit SSB 4, SSB 5, SSB 6, and SSB 7 on physically the same beam, or the base station 110 may transmit SSB 4 on a beam close to the beam used for transmitting SSB 5, SSB 6, and SSBI, such that SSB5, SSB6, and SSB 7 pass through at least a portion of Region C. In this case, although SSBs 5-7 pass through Region C when transmitted in the direction toward the RIS 305, SSBs 5-7 are not be intended to serve Region C. SSB 4 may be transmitted in the direction toward the RIS 305, but SSB 4 is not reflected (or relayed) by the RIS 305.

In some examples, UE 3 in region C may observe or detect any (or all) of SSBs 4-7, and UE 3 may attempt to perform initial access using RACH resources associated with any (or all) of SSBs 4-7. In this case, although only SSB 4 is intended for region C, UE 3 may not be able to distinguish SSB 4 from the other SSBs (e.g., SSBs 5-7) that are intended for the RIS 305. If UE 3 attempts to perform initial access using SSB 5, SSB 6, and/or SSB 7 (e.g., using the RACH resources associated with SSB 5, SSB 6, and/or SSB 7), the base station may assume that UE 3 is in region B and served by the RIS 305. This may lead to the base station 110 transmitting RIS control messages to the RIS 305 for transmissions to (and/or from) UE 3 (which do not need to be reflected by the RIS 305), resulting in unnecessary control signaling overhead. Furthermore, signals transmitted to UE 3 may be unnecessarily reflected or redirected to region B, resulting in increased interference to other UEs in region B.

As indicated above, FIG. 5 is provided as an example. Other examples may differ from what is described with respect to FIG. 5.

Figure 6:
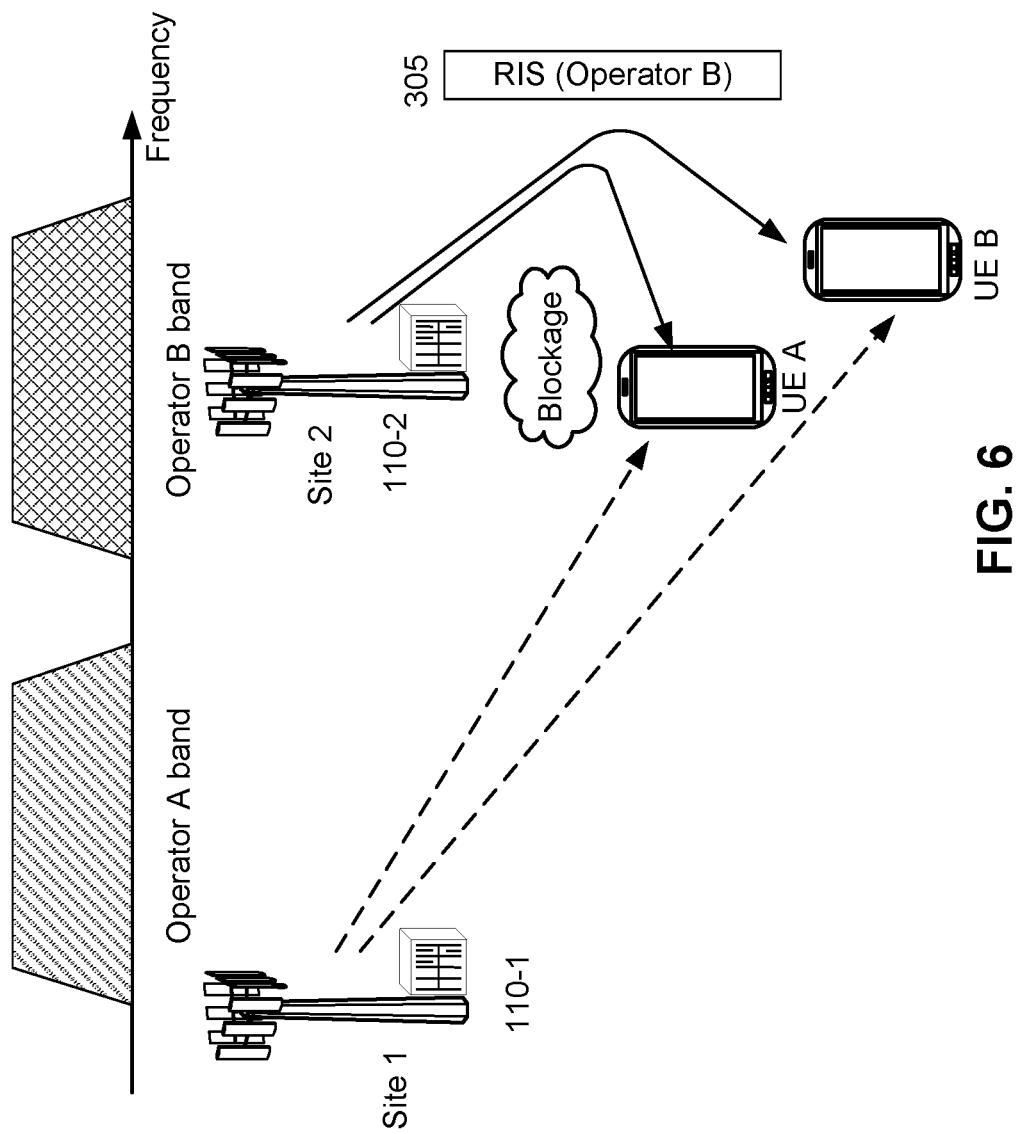
FIG. 6 is a diagram illustrating an example of communications using an RIS in a wireless network with multiple operators, in accordance with the present disclosure.

FIG. 6 is a diagram illustrating an example 600 of communications using an RIS in a wireless network with multiple operators, in accordance with the present disclosure. As shown in FIG. 6, example 600 includes a first base station 110-1 at a first cell site (site 1), a second base station 110-2 at a second cell site (site 2), a first UE 120 (UE A), a second UE 120 (UE B), and an RIS 305.

In some examples, multiple operators (e.g., service providers) may share cell sites. As shown in FIG. 6, a first operator (operator A) and a second operator (operator B) may share sites 1 and 2. For example, operator A and operator B may share the first base station 110-1 at site 1, and operator A and operator B may share the second base station 110-2 at site 2. In some examples, the first base station 110-1 and the second base station 110-2 may be two transit receive points (TRPs) (e.g., first and second TRPs) for a cell. Operator A and operator B may operate in different frequency bands. For example, operator A and operator B operate in adjacent channels. UE A may be served by operator A, and UE B may be served by operator B.

As shown in FIG. 6, operator B may deploy the RIS 305. In order to serve UE B in a coverage hole (e.g., due to a blockage), operator B may control the RIS 305 to reach UE B. In some examples, operators A and B may be synchronized, and may transmit SSBs at the same time. In some examples, unlike active radio frequency (RF)-type relays, the RIS 305 may not be frequency selective, and signals transmitted by operator A from the second base station 110-2 may be reflected by the RIS 305 as well as signals transmitted by operator B from the second base station. For example, SSB-A and SSB-B transmitted from the second base station may both be reflected by the RIS 305. In some cases, UE A and UE B may receive respective SSBs with high strength (e.g., high RSRP) from the second base station 110-2 through the RIS 305. In this case, both UE A and UE B may establish a connection with the second base station. However, because the RIS 305 is controlled by operator B, operator B may change the state of the RIS 305, which may cause UE A to lose the connection with the second base station 120. Accordingly, for UE A, establishing a connection with the first base station 110-1 may increase reliability of network communications for UE A, as compared with a connection with the second base station 110-2 through the RIS operated by operator B. However, UE A may be prevented from connecting to the first base station 110-1 in cases in which the strength of an SSB from the second base station 110-2 through the RIS 305 is higher than the strength of an SSB from the first base station.

As indicated above, FIG. 6 is provided as an example. Other examples may differ from what is described with respect to FIG. 6.

Some techniques and apparatuses described herein enable a base station to transmit a signal to be redirected by an RIS using a modulation signature associated with the RIS. The RIS may redirect the signal using modulation that reverses the modulation signature associated with the RIS. A UE may receive the signal that is transmitted by the base station with the modulation signature associated with the RIS and redirected by the RIS using the modulation that reverses the modulation signature associated with the RIS. The UE may decode the signal. In some aspects, the signal may be decodable by the UE based at least in part on the signal being redirected by the RIS using the modulation that reverses the modulation signature associated with the RIS. In some aspects, the signal may be undecodable by the UE before being redirected by the RIS using the modulation that reverses the modulation signature associated with the RIS. As a result, an SSB associated with an RIS may be undecodable by a UE prior to being redirected by the RIS, which may prevent the UE from performing initial access using the SSB associated with the RIS before the SSB has been redirected by the RIS. This may reduce unnecessary control signaling overhead for the base station, and may reduce interference to other UEs resulting from unnecessarily redirecting signals for the UE to a region other than the region where the UE is located.

In some aspects, the RIS may apply the modulation to reverse the modulation signature associated with the RIS to a signal that is not modulated using the modulation signature associated with the RIS, which may cause the signal to become undecodable by a UE once the signal is redirected by the RIS. For example, a signal (e.g., an SSB) associated with a different operator from an operator that controls the RIS may be transmitted without the modulation signature associated with the RIS, and may become undecodable by a UE once the signal is redirected by the RIS. This may prevent a UE associated with the different operator from the operator that control the RIS from establishing a connection with a base station through the RIS, which may increase reliability of network communications for the UE.

Figure 7:
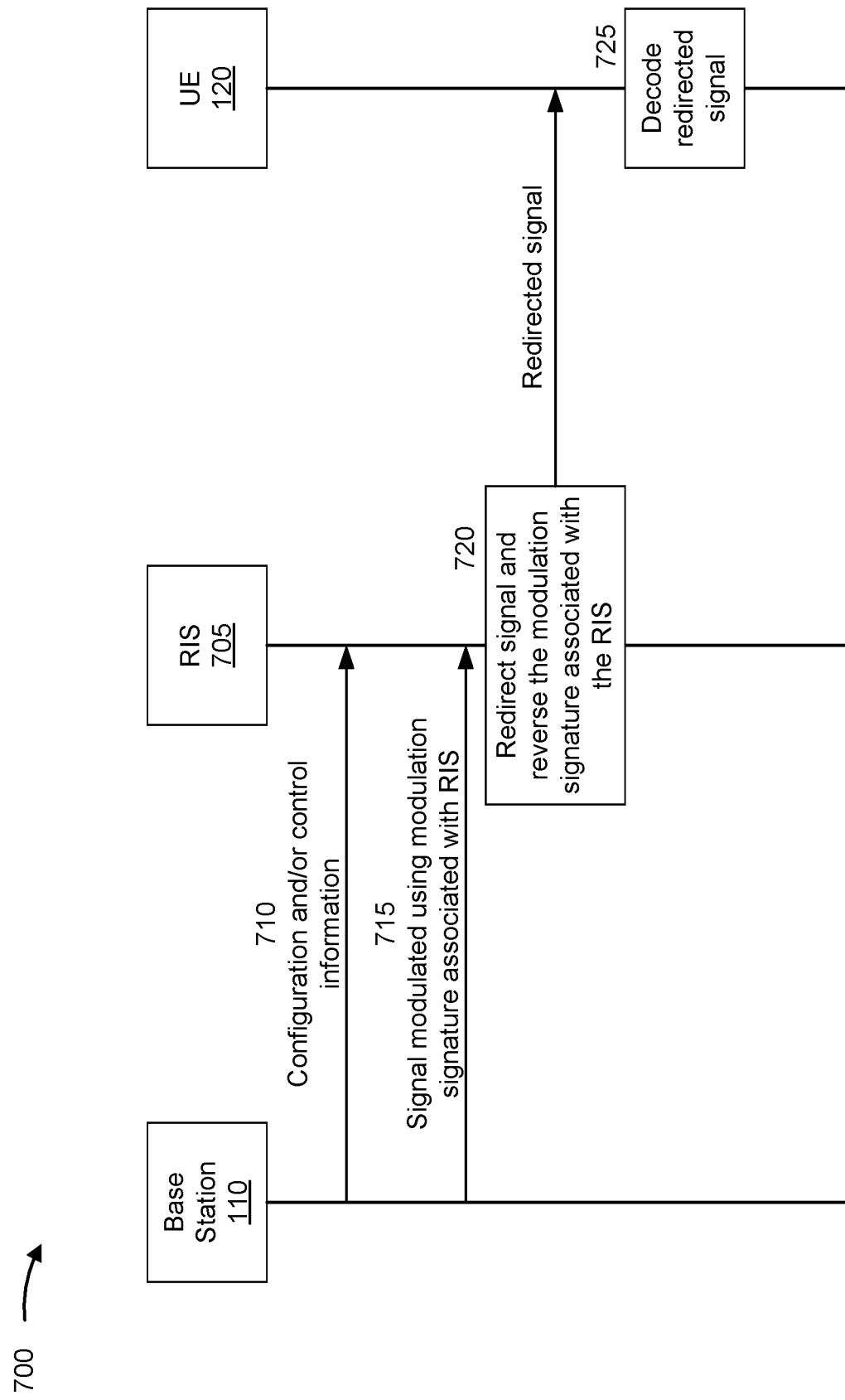
FIGS. 7-9 are diagrams illustrating examples associated with efficient RIS-assisted communication, in accordance with the present disclosure.

FIG. 7 is a diagram illustrating an example 700 associated with efficient RIS-assisted communication, in accordance with the present disclosure. As shown in FIG. 7, example 700 includes communication between a base station 110 and a UE 120. In some aspects, the base station 110 and the UE 120 may be included in a wireless network, such as wireless network 100. BS 110 and UE 120 may communicate via a wireless access link, which may include an uplink and a downlink. As shown in FIG. 7, in some aspects, the base station 110 and the UE 120 may communicate via an RIS 705. The RIS 705 may be similar to the RIS 305 described in connection with FIGS. 3-6.

As shown in FIG. 7, and by reference number 710, the base station 110 may transmit, to the RIS 705, configuration and/or control information associated with the RIS 705. The configuration and/or control information may include information relating to a modulation signature associated with the RIS 705. "Modulation signature" may refer to a pattern or sequence of modulation added to a signal to be reflected or redirected by the RIS 705. The modulation signature may also be referred to as an RIS watermark. The modulation signature may be an RIS-specific modulation signature for the RIS 705. In some aspects, the modulation signature may be an RIS-specific modulation signature applied by the base station 110 to signals to be redirected by the RIS 705. In this case, the RIS 705 may apply an inverse modulation pattern associated with the modulation signature to signals redirected by the RIS 705. An "inverse modulation pattern" associated with a modulation signature may refer to a pattern that reverses the modulation signature applied to a signal. "Reversing" the modulation signature may refer to recovering a demodulated signal from a signal modulated using the modulation signature (e.g., recovering an original signal to which the modulation signature was applied). In some aspects, the inverse modulation pattern applied by the RIS 705 may be an RIS-specific modulation pattern that reverses the RIS-specific modulation signature associated with the RIS 705. The inverse modulation pattern may also be referred to an inverse RIS watermark.

In some aspects, the configuration and/or control information may include an indication of the modulation signature associated with the RIS 705 to be applied (by the base station 110) to one or more signals to be redirected by the RIS 705. In this case, the RIS 705 may receive the indication of the modulation signature associated with the RIS 705, and the RIS 705 may determine the inverse modulation pattern associated with the modulation signature (e.g., the modulation pattern that reverses the modulation signature). In some aspects, the configuration and/or control information may include an indication of the inverse modulation pattern to be applied by the RIS 705 to reverse the modulation pattern associated with the RIS 705. In some aspects, the base station 110 may transmit the indication of the modulation signature associated with the RIS 705 and/or the indication of the inverse modulation pattern in configuration information to configure the RIS 705 to apply the inverse modulation pattern associated with the modulation signature to all signals or a set of signals redirected by the RIS 705. In some aspects, the base station 110 may transmit the indication of the modulation signature associated with the RIS 705 and/or the indication of the inverse modulation pattern in control information (e.g., in an RIS control message) to control the RIS 705 (e.g., on a per signal basis) to apply the inverse modulation pattern associated with the modulation signature for one or more signals redirected by the RIS 705.

In some aspects, in a case in which there are multiple RISs in a cell associated with the base station 110, the base station 110 may transmit, to each RIS, at least one of an indication of a respective RIS-specific modulation signature associated with that RIS (e.g., to be applied by the base station 110 for signals to be redirected by that RIS) or an indication of a respective inverse modulation pattern to be applied by that RIS to reverse the RIS-specific modulation signature associated with that RIS. In some aspects, the configuration and/or control information may indicate a beam state or a beam direction of the RIS 705 that is associated with the modulation signature. For example, multiple modulation signatures (or inverse modulation patterns) may be indicated for multiple beam states and/or beam directions of the RIS 705, and/or the RIS 705 may be configured/controlled to apply the inverse modulation pattern associated with a modulation signature when redirecting a signal using the beam state(s) or beam direction(s) associated with the modulation signature.

The modulation signature associated with the RIS 705 (e.g., to be applied by the base station 110 to a signal to be redirected by the RIS 705) may be a phase modulation signature, a frequency modulation signature, a polarization modulation signature, and/or an amplitude modulation signature, among other examples. "Phase modulation signature" may refer to a pattern or sequence of phase changes or phase shifts, added (e.g., by the base station 110) to a signal that is to be reflected or redirected by the RIS 705. "Frequency modulation signature" may refer to a pattern or sequence of frequency changes or frequency shifts, added (e.g., by the base station 110) to a signal that is to be reflected or redirected by the RIS 705. "Polarization modulation signature" may refer to a pattern or sequence of polarization states (e.g., angle or polarization or polarization mode), added (e.g., by the base station 110) to a signal that is to be reflected or redirected by the RIS 705. "Amplitude modulation signature" may refer to a pattern or sequence of amplitude changes or amplitude shifts, added (e.g., by the base station 110) to a signal that is to be reflected or redirected by the RIS 705.

In some aspects, for a phase modulation signature, the phase modulation signature may be a time-domain phase shift pattern, and the base station 110 may modulate (e.g., scramble) a signal that is to be reflected or redirected by the RIS 705 by applying the time-domain phase shift pattern to the signal to be reflected or redirected by the RIS 705. The time-domain phase shift pattern may include phase changes (e.g., phase shifts) that are included in a set of phase changes (e.g., a finite set of phase changes). For example, the time-domain phase shift pattern may include phase changes from a set of phase changes that includes ±90°, ±45°, and/or ±30°, among other examples. In some aspects, in order to minimize negative effects of inter-carrier interference or inter-symbol interference, the phase changes may be applied (e.g., by the base station 110) on an OFDM symbol level (e.g., may be applied at OFDM symbol boundaries). For example, the modulation signature may modulate the signal (e.g., in phase) at each symbol of a set of symbols associated with the signal or at a subset of symbols of the set of symbols. In some aspects, the configuration information may indicate the set of symbols and/or the subset of symbols that are to be associated with the phase change. In some aspects, the modulation signature may apply the phase changes per sample or a per group of samples, and the configuration information may indicate the samples and/or the groups of samples that are to be associated with the phase changes. In some aspects, the inverse modulation pattern applied by the RIS 705 when reflecting or redirecting a signal may reverse (e.g., descramble) the phase shifts applied to the signal by the base station 110 in accordance with the phase modulation signature.

For a frequency modulation signature, the base station 110 may apply a frequency change to a signal that is to be reflected or redirected by the RIS 705, in accordance with the frequency modulation signature associated with the RIS 705. The frequency modulation signature may identify a pattern for applying a frequency shift (e.g., by a number of subcarriers) to a signal that is to be reflected and/or redirected by the RIS 705. For example, the frequency modulation signature may modulate the frequency at each subcarrier of a set of subcarriers associated with the signal (e.g., to be redirected by the RIS 705) or at a subset of subcarriers of the set of subcarriers. In some aspects, the configuration information may indicate the set of subcarriers and/or the subset of subcarriers that are to be associated with the frequency change, and the configuration information may indicate the size of the frequency shift (e.g., the number of subcarriers) to be applied to the set of subcarriers and/or the subset of carriers. In some aspects, the inverse modulation pattern applied by the RIS 705 when reflecting or redirecting a signal may reverse the frequency shifts applied to signal by the base station 110 in accordance with the frequency modulation signature.

For a polarization modulation signature, the base station 110 may change a polarization of a signal that is to be reflected or redirected by the RIS 705, in accordance with the polarization modulation signature associated with the RIS 705. For example, the polarization of the signal to be reflected by the RIS 705 may be modulated (e.g., scrambled) by the polarization modulation signature. For example, the base station 110 may modify the signal, in accordance with the polarization modulation signature, from a first polarization state of the signal to a second polarization state of the signal. In this case, the inverse modulation pattern applied by the RIS 705 when reflecting or redirecting the signal may modify the signal from the second polarization state back to the first polarization state. The polarization state (e.g., the first polarization state and/or the second polarization state) may include an angle of polarization (e.g., for linear polarization) or a polarization mode (e.g., the first polarization state and the second polarization state may use different polarization modes). A polarization mode may include linear polarization, circular polarization, and/or elliptical polarization, among other examples. In some aspects, in order to minimize negative effects of inter-carrier interference or inter-symbol interference, the polarization changes may be applied (e.g., by the base station 110) on an OFDM symbol level (e.g., may be applied at OFDM symbol boundaries). For example, the modulation signature associated with the RIS 705 may modulate the polarization of the signal at each symbol of a set of symbols associated with the signal (e.g., to be reflected by the RIS 705) or at a subset of symbols of the set of symbols. In some aspects, the configuration information may indicate the set of symbols and/or the subset of symbols that are to be associated with the polarization change.

For an amplitude modulation signature, the base station 110 may attenuate the amplitude of the signal (e.g., to be reflected or redirected by the RIS 705) in accordance with the amplitude modulation signature associated with the RIS 705. In some aspects, the base station 110 may attenuate the amplitude of the signal by puncturing the signal at certain time intervals in accordance with a pattern identified in the modulation signature associated with the RIS 705. For example, the signal may be modulated (e.g., by the base station 110) with attenuation in the amplitude of the signal (e.g., where with amplitude is reduced) or with gaps (e.g., where the amplitude is zero). The pattern or sequence of the attenuation or the gaps identified in the amplitude modulation signature may be specific to the RIS 705 (e.g., for signals to be reflected or redirected by the RIS 705).

As further shown in FIG. 7, and by reference number 715, the base station 110 may transmit a signal modulated using the modulation signature associated with the RIS 705. The base station 110 may modulate a signal associated with the RIS 705 (e.g., a signal to be reflected or redirected by the RIS 705) using the modulation signature associate with the RIS 705. For example, the signal may be (or may include) an SSB signal, a reference signal (RS), and/or a data signal, among other examples, that is to be reflected or redirected by the RIS 705. The base station 110 may transmit the modulated (e.g., scrambled) signal on a beam in a spatial direction toward the RIS 705.

The base station 110 may modulate the signal to be redirected (or reflected) by the RIS 705 using the modulation signature associated with the RIS 705. In some aspects, the base station 110 may modulate the signal to apply a time-domain phase shift pattern to the signal (e.g., in accordance with a phase modulation signature), may modulate the signal to apply a frequency shift (e.g., of a number of subcarriers) to the signal (e.g., in accordance with a frequency modulation signature), may modulate a polarization of the signal (e.g., in accordance with a polarization modulation signature), and/or may modulate an amplitude of the signal (e.g., in accordance with an amplitude modulation signature). For example, the base station 110 may modulate (e.g., scramble) at least one of the phase, the amplitude, the frequency, or the polarization of the signal at the symbol boundaries of the signal, in accordance with an RIS-specific pattern or sequence of modulation identified in the modulation signature associated with the RIS 705.

In some aspects, the base station 110 may transmit one or more first signals associated with the RIS 705, and the base station 110 may transmit one or more second signals not associated with the RIS 705. For example, the one or more first signals may be signals to be reflected or redirected by the RIS 705 (e.g., to cover a region outside of a coverage area of the base station 110), and the one or more second signals may be signals associated with direction transmission from the base station 110 (e.g., without being reflected or redirected by the RIS 705). The base station 110 may transmit each first signal using the modulation signature associated with the RIS 705. For example, the base station 110 may modulate each first signal using the modulation signature associated with the RIS 705, and transmit each modulated (e.g., scrambled) first signal in a first beam direction associated with the RIS 705. The base station 110 may transmit each second signal without using the modulation signature associated with the RIS 705 (e.g., without scrambling the second signal).

In some aspects, the base station 110 may transmit a second signal without using the modulation signature associated with the RIS 705 in the first beam direction associated with the RIS 705 or in a second beam direction that is close to the first beam direction (e.g., the second beam direction may satisfy a distance threshold with respect to the first beam direction). This may result in a UE (e.g., a UE in a region between the base station 110 and the RIS 705) detecting/receiving a scrambled first signal (e.g., a first signal modulated by the base station 110 using the modulation signature associated with the RIS 705) and/or a second signal that is transmitted from the base station 110 without being scrambled (e.g., without being modulated using the modulation signature associated with the RIS 705). In this case, the scrambled first signal transmitted from the base station 110 may be undecodable for a UE (e.g., UE 120) that receives or detects the scrambled first signal before that first signal is redirected by the RIS 705. The second signal, which is transmitted from the base station 110 without being scrambled, may be decodable by a UE (e.g., UE 120) without being redirected by the RIS 705.

As further shown in FIG. 7, and by reference number 720, the RIS 705 redirect (or reflect) the modulated signal transmitted from the base station 110 and reverse the modulation signature associated with the RIS 705 applied to the signal by the base station 110, resulting in redirected signal that is no longer modulated with the modulation signature (e.g., an unscrambled signal). The RIS 705 may receive, from the base station 110, the signal that is modulated using the modulation signature associated with the RIS 705, and the RIS 705 may redirect (or reflect) the signal using modulation that reverses the modulation signature associated with the RIS 705. In some aspects, the RIS 705 may receive one or more signals with the modulation signature applied by the base station 110, and the RIS 705 may reverse the modulation signature applied to the one or more signals and redirect the one or more signals (e.g., without the modulation signature) at one or more different reflection angles. For example, the RIS 705 may change a reflection state (e.g., beam state) of the RIS 705 for each signal received from the base station 110 to redirect each SSB at a different reflection angle.

In some aspects, when the RIS 705 redirects a signal that was modulated by the base station 110 using the modulation signal associated with the RIS 705, the RIS 705 may modulate the signal using the inverse modulation pattern associated with the modulation signature to reverse the modulation signature associated with the RIS 705. The inverse modulation pattern associated with the modulation signature may reverse the modulation performed in accordance with the modulation signature to recover an unscrambled signal (e.g., the original signal that was modulated by the base station 110). For example, the RIS 705 may apply the inverse modulation pattern associated with the modulation signature to reverse modulation, in accordance with the modulation signature, of the phase, the frequency, the polarization, and/or the amplitude of the signal.

In some aspects, the RIS 705 may apply the inverse modulation pattern associated with the modulation signature associated with the RIS 705 to each signal redirected by the RIS 705. For a signal scrambled by the base station 110 using the modulation signature associated with the RIS 705, the RIS 705 reverses the modulation signature, resulting in an unscrambled signal that may be decodable by a UE (e.g., UE 120). When redirecting a signal that is not modulated using the modulation signature associated with RIS 705 (e.g., an unscrambled signal or a signal scrambled using a modulation signature associated with a different RIS), the modulation of the signal, by the RIS 705, using the inverse modulation pattern associated with the modulation signature associated with the RIS 705 may result in a scrambled signal that is undecodable to a UE (e.g., UE 120).

In some aspects, the base station 110 may control the RIS 705 to redirect each signal received from the base station 110. For example, the base station 110 may transmit, to the RIS 705 (e.g., to an RIS controller of the RIS 705), an RIS control signal indicating a configuration of the reconfigurable elements of the RIS 705 for redirecting a signal transmitted by the base station 110. In some aspects, the base station 110 may also control the RIS 705 (e.g., via an RIS control signal) to apply the inverse modulation pattern associated with the modulation signature associated with the RIS 705 to signal received from the base station 110 (e.g., the reverse the modulation signature associated with the RIS 705 that was applied to the signal by the base station 110).

As further shown in FIG. 7, and by reference number 725, the UE 120 may receive the signal redirected from the RIS 705, and the UE 120 may decode the redirected signal. The signal, received by the UE 120, may be a signal that was transmitted by the base station 110 using the modulation signature associated with the RIS 705 and redirected by the RIS 705 using modulation (e.g., the inverse modulation pattern) that reverses the modulation signature associated with the RIS 705. In this case, the signal may be decodable by the UE 120 based at least in part on the RIS 705 redirecting the signal using the modulation that reverses the modulation signature associated with the RIS 705. For example, the signal, when transmitted by the base station 110 using the modulation signature associated with the RIS 705, may be undecodable by the UE 120 before being redirected by the RIS 705 using the modulation (e.g., the inverse modulation pattern) to reverse the modulation signature associated with the RIS 705.

In some aspects, the UE 120 may determine whether a detected/received signal is decodable by the UE 120 based at least in part on a measurement of the signal performed by the UE 120. For example, the UE 120 may measure the RSRP of the signal and determine whether the signal is decodable by the UE 120 based at least in part on a determination of whether the RSRP measurement of the signal satisfies a threshold. In some aspects, in a case in which the UE 120 receives a scrambled signal (e.g., a signal modulated using the modulation signature associated with the RIS 705), the RSRP measurement may not satisfy the threshold, and the UE 120 may determine that the signal is undecodable. In some aspects, when the UE 120 receives an unscrambled signal (e.g., a signal transmitted by the base station 110 without using the modulation signature or a signal transmitted using the modulation signature that has been redirected by the RIS 705 using the inverse modulation pattern to reverse the modulation signature), the UE 120 may determine that the RSRP measurement satisfies the threshold, and the UE 120 may decode the signal.

In some aspects, the signal received by the UE 120 may be (or may include) an SSB. In this case, the UE 120 may decode the SSB and perform initial access using the SSB. For example, the UE 120 may perform RIS-assisted initial access in which messages between the UE 120 and the base station 110 in an initial access procedure (e.g., a RACH procedure) are transmitted via an indirect link through the RIS 705. In some aspects, the signal received by the UE 120 may include an RS, data (e.g., downlink data), and/or control information (e.g., downlink control information), among other examples.

As described above, the base station 110 may transmit a signal to be redirected by the RIS 705 using a modulation signature associated with the RIS 705. The RIS 705 may redirect the signal using modulation that reverses the modulation signature. The UE 120 may receive the signal that is transmitted by the base station 110 with the modulation signature and redirected by the RIS 705 using the modulation that reverses the modulation signature. The UE 120 may decode the signal. In some aspects, the signal may be decodable by the UE 120 based at least in part on the signal being redirected by the RIS 705 using the modulation that reverses the modulation signature. In some aspects, the signal may be undecodable by the UE 120 before being redirected by the RIS 705 using the modulation that reverses the modulation signature. As a result, an SSB associated with an RIS may be undecodable by a UE prior to being redirected by the RIS, which may prevent the UE from performing initial access using the SSB associated with the RIS before the SSB has been redirected by the RIS. This may reduce unnecessary control signaling overhead for the base station, and may reduce interference to other UEs resulting from unnecessarily redirecting signals for the UE to a region other than the region where the UE is located.

In some aspects, an RIS may apply the modulation to reverse the modulation signature associated with the RIS to a signal that is not modulated using the modulation signature associated with the RIS, which may cause the signal to become undecodable by a UE once the signal is redirected by the RIS. For example, a signal (e.g., an SSB) associated with a different operator from an operator that controls the RIS may be transmitted without the modulation signature associated with the RIS, and may become undecodable by a UE once the signal is redirected by the RIS. This may prevent a UE associated with the different operator from the operator that control the RIS from establishing a connection with a base station through the RIS, which may increase reliability of network communications for the UE.

As indicated above, FIG. 7 is provided as an example. Other examples may differ from what is described with respect to FIG. 7.

Figure 8:
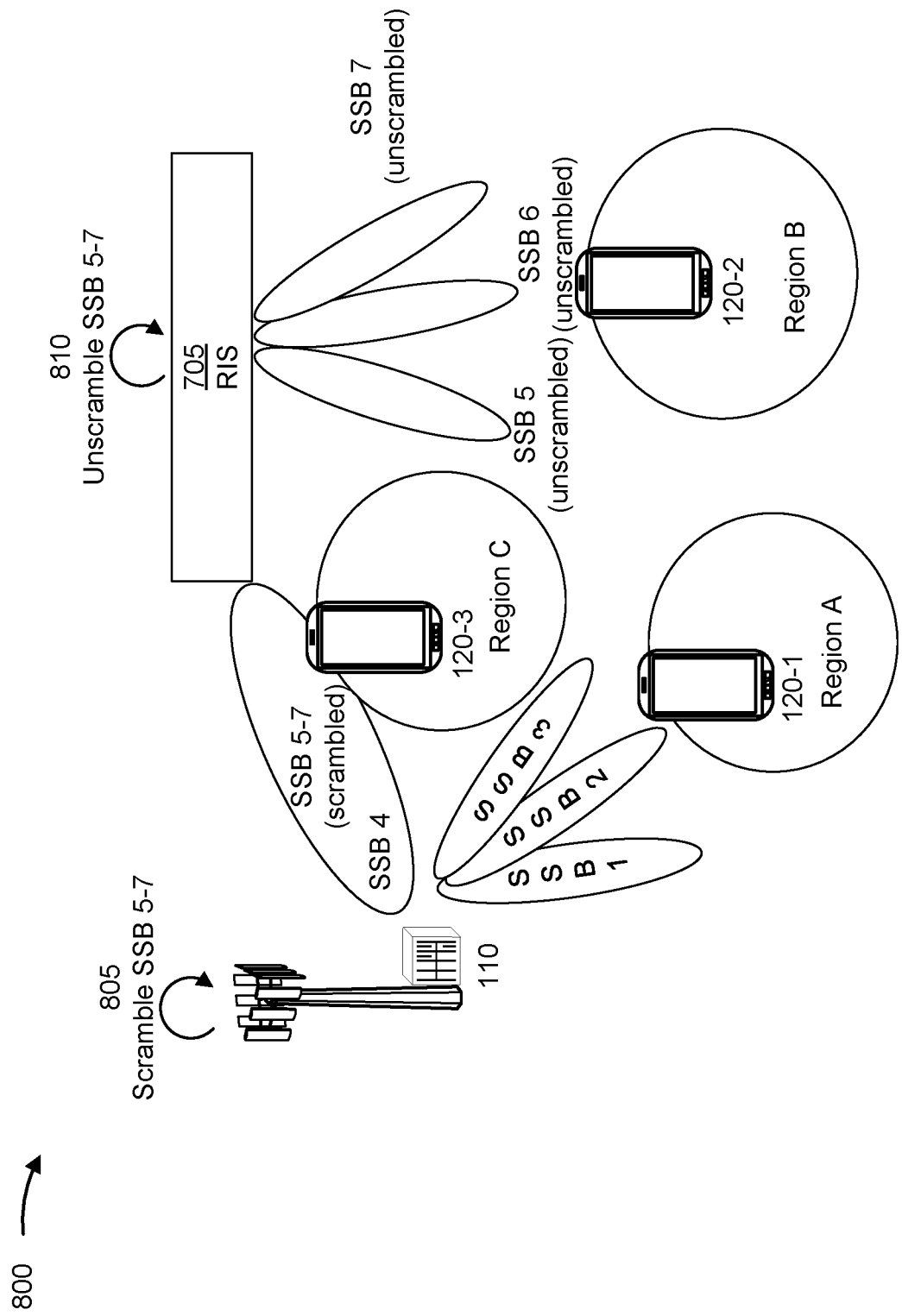

FIG. 8 is a diagram illustrating an example 800 associated efficient RIS-assisted communication, in accordance with the present disclosure. As shown in FIG. 8, example 800 includes a base station 110, a first UE 120-1, a second UE 120-2, a third UE 120-3, and an RIS 705.

As shown in FIG. 8, the base station 110 may transmit an SSB burst that includes a first set of SSBs (e.g., SSB 1, SSB 2, SSB 3, and SSB 4) that are associated with direct transmission from the base station 110 and a second set of SSBs (e.g., SSB 5, SSB, 6, and SSB 7) that are associated with the RIS 705. The base station 110 may transmit SSB 1, SSB 2, SSB 3, and SSB 4 on different beams having different beam directions. The base station 110 may transmit SSB 5, SSB 6, and SSB 7 on a beam directed toward the RIS 705, and the RIS 705 may redirect SSB 5, SSB 6, and SSB 7 at different reflection angles associated with different reflection states of the RIS 705. As shown by reference number 805, the base station 110 may scramble each of SSB 5, SSB 6, and SSB 7. For example, the base station 110 may modulate each of SSB 5, SSB 6, and SSB 7 using a modulation signature associated with the RIS 705. As shown by reference number 810, the RIS 705 may unscramble each of SSB 5, SSB 6, and SSB 7. For example, the RIS 705 may modulate each of SSB 5, SSB 6, and SSB 7, using an inverse modulation pattern that reverses the modulation signature associated with the RIS 705, such that the SSBs (e.g., SSB 5, SSB 6, and SSB 7) are unscrambled after being redirected by the RIS 705. The base station 110 may transmit SSB 1, SSB 2, SSB 3, and SSB 4, without applying the modulation signature associated with the RIS 705.

As shown in FIG. 8, SSB 1, SSB 2, and SSB 3 may be used to serve UEs in region A (e.g., the first UE 120-1). In some aspects, the first UE 120-1 may detect/receive one of the SSBs (e.g., SSB 1, SSB 2, or SSB 3) serving region A. For example, the first UE 120-1 may detect/receive SSB 2. In this case, SSB 2, which is not modulated using the modulation signature associated with the RIS 705, may be decodable by the first UE 120-1. The first UE 120-1 may decode SSB 2, obtain system information associated with SSB 2, and perform initial access using SSB 2 (e.g., based at least in part on the system information associated with SSB 2). For example, the first UE 120-1 may transmit an initial access message (e.g., a first message (Msg 1) in a RACH procedure) to the base station 110 using a RACH resource associated with SSB 2.

SSB 4 may be used to serve UEs in region C (e.g., the third UE 120-3). SSB 5, SSB 6, and SSB 7 may be used to serve UEs 120 in region B (e.g., the second UE 120-2) through the RIS 705. As shown in FIG. 8, the base station 110 may transmit SSB 4, which is associated with direct transmission from the base station 110, on a same beam as SSB 5, SSB 6, and SSB 7, which are associated with the RIS 705, or on a beam close to (e.g., within a distance threshold of) the beam used for transmitting SSB 5, SSB 6, and SSB 7. The third UE 120-3 in region C may observe or detect any (or all) of SSBs 4-7. SSBs 5-7 may be scrambled by the base station 110 (e.g., using the modulation signature associated with the RIS 705), and the third UE 120-3 may detect/receive SSBs 5-7 before SSBs 5-7 are redirected and unscrambled by the RIS 705 (e.g., using the inverse modulation pattern that reverses the modulation signature associated with the RIS 705). Due to the scrambling of SSBs 5-7, SSBs 5-7 may be undecodable for the third UE 120-3, and the third UE 120-3 may be only able to decode SSB 4. For example, the RSRP measurements for third UE 120-3 for SSBs 5-7 may be very low due to scrambling, and may not satisfy a threshold, resulting in the SSBs 5-7 undecodable for the third UE 120-3. The third UE 120-3 may decode SSB 4, obtain system information associated with SSB 4, and perform initial access using SSB 4 (e.g., based at least in part on the system information associated with SSB 4). For example, the third UE 120-3 may transmit an initial access message (e.g., Msg 1 in a RACH procedure) to the base station 110 using a RACH resource associated with SSB 4.

In some aspects, the second UE 120-2 may detect/receive one or more of the SSBs (e.g., SSB 5, SSB 6, or SSB 7) serving region B. In this case, the second UE 120-2 may detect/receive one or more SSBs 5-7 after the RIS 705 redirects and unscrambles SSBs 5-7 (e.g., using the inverse modulation pattern that reverses the modulation signature associated with the RIS 705). For example, the second UE 120-2 may detect/receive SSB 6 after SSB 6 is redirected and unscrambled by the RIS 705. In this case, SSB 6 may be decodable for the second UE 120-2 based at least in part on the RIS 705 redirecting and unscrambling SSB 6. The second UE 120 decode SSB 6, obtain system information associated with SSB 6, and perform initial access (e.g., RIS-assisted initial access) using SSB 6 (e.g., based at least in part on the system information associated with SSB 6). For example, the second UE 120-2 may transmit an initial access message to the base station 110, via an indirect link through the RIS 705, using a RACH resource associated with SSB 6.

In some aspects, the system information associated with the SSBs (e.g., SSBs 1-4) associated with direction transmission from the base station 110 may be different from the system information associated with the SSBs (e.g., SSBs 5-7) associated with RIS-assisted communication. For example, the system information in the MIB, PBCH payload, system information block (SIB) type 1 (SIB1), and/or one or more other SIBs may be different for access (e.g., via a direct link with the base station 110) using SSBs 1-4 and for access (e.g., via an indirect link with the base station 110 through the RIS 705) using SSBs 5-7. In some aspects, common control signaling (e.g., paging) may also be different for access (e.g., via a direct link with the base station 110) using SSBs 1-4 and for access (e.g., via an indirect link with the base station 110 through the RIS 705) using SSBs 5-7. For example, based at least in part on the different system information and common control signaling, the RIS 705 may be treated by a UE 120 as an independent cell from the base station 110.

In some aspects, SSBs 1-4 may have a first PBCH payload (e.g., MIB), and may indicate a first SIB1. The first SIB1 may include RACH and initial access related information associated with SSBs 1-4. SSBs 5-7 may have a second PBCH payload (e.g., MIB) and may indicate a second SIB1. The second SIB1 may include RACH and initial access related information associated with SSBs 5-7. In some aspects, due to the scrambling of SSBs 5-7 by the base station 110, a UE 120 in region C (e.g., the third UE 120-3) may not be prevented from decoding SSBs 5-7 and obtaining the second MIB and the second SIB1.

As indicated above, FIG. 8 is provided as an example. Other examples may differ from what is described with respect to FIG. 8.

Figure 9:
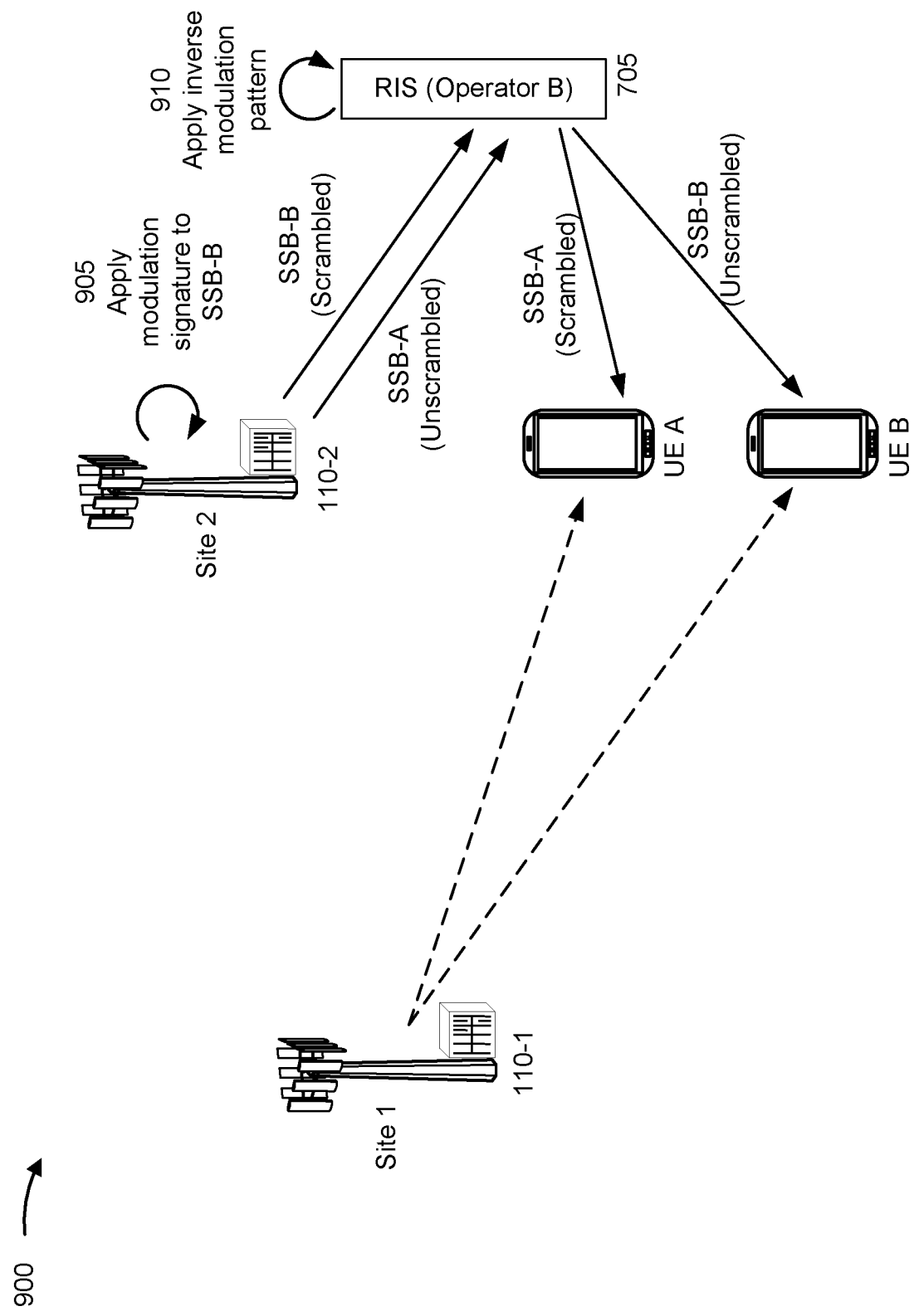

FIG. 9 is a diagram illustrating an example 900 associated efficient RIS-assisted communication, in accordance with the present disclosure. As shown in FIG. 6, example 900 includes a first base station 110-1 at a first cell site (site 1), a second base station 110-2 at a second cell site (site 2), a first UE 120 (UE A), a second UE 120 (UE B), and an RIS 705.

As shown in FIG. 9, a first operator (operator A) and a second operator (operator B) may share sites 1 and 2. For example, operator A and operator B may share the first base station 110-1 at site 1, and operator A and operator B may share the second base station 110-2 at site 2. In some aspects, the first base station 110-1 may be a first TRP in a cell, and the second base station 110-2 may be a second TRP in the cell. Operator A and operator B may operate in different frequency bands. UE A may be served (e.g., from the first base station 110-1 and/or the second base station 110-2) by operator A in a first frequency band, and UE B may be served (e.g., from the first base station 110-1 and/or the second base station 110-2) by operator B in a second frequency band.

As shown in FIG. 9, operator B may deploy the RIS 705. For example, operator B may control the state of the RIS for redirecting signals transmitted via the RIS between the second base station 110-2 and UE B. In some cases, signals transmitted by operator A from the second base station 110-2 may be reflected by the RIS 305 (e.g., based at least part on the state of the RIS controlled by operator B). Operator A may transmit, from the second base station 110-2, one or more SSBs (e.g., SSB-A) for connecting with the second base station 110-2. Operator B may transmit, from the second base station 110-2, one or more SSBs (e.g., SSB-B) for connecting with the second base station 110-2. The transmission of SSB-A and SSB-B from the second base station 110-2 may be synchronized, and SSB-A and SSB-B may both be reflected by the RIS 705.

As shown by reference number 905, the second base station 110-2 may apply to SSB-B (e.g., the SSB associated with operator B that controls the RIS 705) the modulation signature associated with the RIS 705, and the second base station 110-2 may transmit a scrambled SSB-B toward the RIS 705. Because SSB-A is not associated with the operator that controls the RIS 705, the second base station 110-2 transmit SSB-A without applying the modulation signature associated with the RIS 705 (e.g., an unscrambled SSB-A may be transmitted by the second base station 110-2). The RIS 705 may redirect SSB-A and SSB-B. As shown by reference 910, the RIS 705 may apply the inverse modulation pattern associated with the modulation signature to each signal redirected by the RIS 705. When the RIS 705 redirects the scrambled SSB-B, the inverse modulation pattern may reverse the modulation signature associated with the RIS 705, resulting in an unscrambled SBB-B. When the RIS 705 redirects the unscrambled SSB-A, the application of the inverse modulation pattern to the SSB-A that was not modulated using the modulation signature associated with the RIS 705 may result in SSB-A being scrambled with a pattern that is unknown to devices (e.g., UE A) served by operator A.

In some aspects, the unscrambled SSB-B may be decodable by UE B. For example, UE B may decode the SSB-B and perform initial access using SSB-B to establish a connection with the second base station 110-2 through the RIS 705.

In some aspects, the scrambled SSB-A resulting from the redirection by the RIS 705 may be undecodable by UE A. Accordingly, UE A may be unable to decode any SSB from the second base station 110-2 (e.g., from site 2) that is redirected or reflected by the RIS 705. In this case, UE A may instead detect and decode an SSB from the first base station 110-1 (e.g., from site 1), and the UE A may perform initial access to establish a connection with the first base station 110-1. As a result, the connection for UE A is not affected by changes to the state of the RIS 705 controlled by operator B, which may increase reliability of network communications for UE A.

As indicated above, FIG. 9 is provided as an example. Other examples may differ from what is described with respect to FIG. 9.

Figure 10:
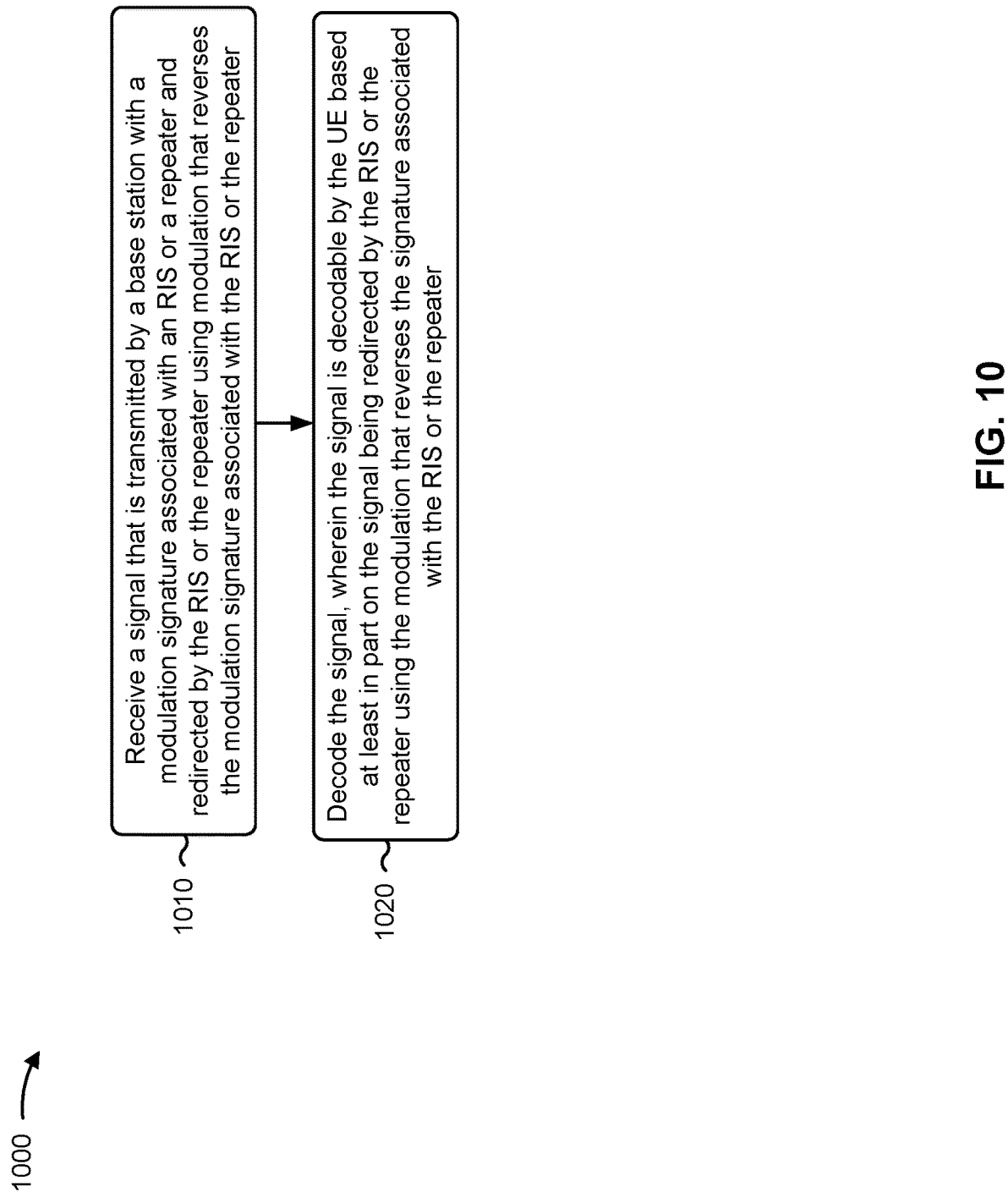
FIGS. 10-12 are diagrams illustrating example processes associated with efficient RIS-assisted communication, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with efficient RIS-assisted communication.

As shown in FIG. 10, in some aspects, process 1000 may include receiving a signal that is transmitted by a base station with a modulation signature associated with an RIS or a repeater and redirected by the RIS or the repeater using modulation that reverses the modulation signature associated with the RIS or the repeater (block 1010). For example, the UE (e.g., using communication manager 140 and/or reception component 1302, depicted in FIG. 13) may receive a signal that is transmitted by a base station with a modulation signature associated with an RIS or a repeater and redirected by the RIS or the repeater using modulation that reverses the modulation signature associated with the RIS or the repeater, as described above.

As further shown in FIG. 10, in some aspects, process 1000 may include decoding the signal, wherein the signal is decodable by the UE based at least in part on the signal being redirected by the RIS or the repeater using the modulation that reverses the modulation signature associated with the RIS or the repeater (block 1020). For example, the UE (e.g., using communication manager 140 and/or decoding component 1308, depicted in FIG. 13) may decode the signal, wherein the signal is decodable by the UE based at least in part on the signal being redirected by the RIS or the repeater using the modulation that reverses the modulation signature associated with the RIS or the repeater, as described above.

Process 1000 may include additional aspects, such as any single aspect or any combination of aspects described below and/or in connection with one or more other processes described elsewhere herein.

In a first aspect, the signal is undecodable by the UE before being redirected by the RIS or the repeater using the modulation that reverses the modulation signature associated with the RIS or the repeater.

In a second aspect, alone or in combination with the first aspect, decoding the signal includes decoding the signal in connection with a determination that the signal is decodable by the UE, and the determination that the signal is decodable by the UE is based at least in part on a measurement of the signal.

In a third aspect, alone or in combination with one or more of the first and second aspects, the signal includes a synchronization signal block (SSB) associated with the RIS or the repeater.

In a fourth aspect, alone or in combination with one or more of the first through third aspects, information associated with the SSB block is different from system information associated with one or more other SSBs that are not associated with the RIS or the repeater.

In a fifth aspect, alone or in combination with one or more of the first through fourth aspects, the modulation signature is at least one of a frequency modulation signature, a phase modulation signature, a polarization modulation signature, or an amplitude modulation signature.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
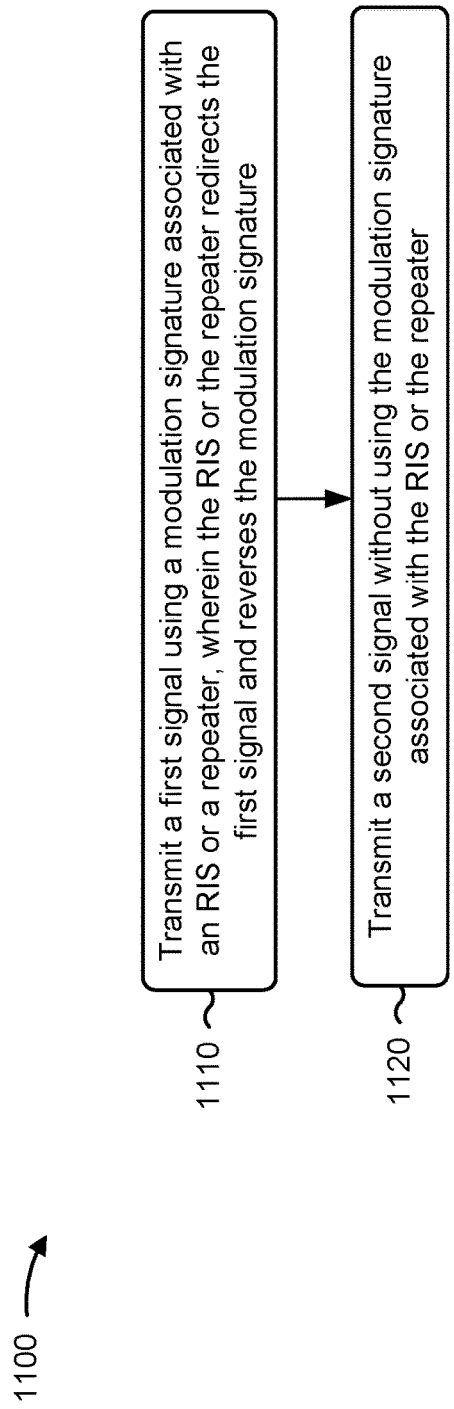

FIG. 11 is a diagram illustrating an example process 1100 performed, for example, by a base station, in accordance with the present disclosure. Example process 1100 is an example where the base station (e.g., base station 110) performs operations associated with efficient RIS-assisted communication.

As shown in FIG. 11, in some aspects, process 1100 may include transmitting a first signal using a modulation signature associated with an RIS or a repeater, wherein the RIS or the repeater redirects the first signal and reverses the modulation signature (block 1110). For example, the base station (e.g., using communication manager 150 and/or transmission component 1404, depicted in FIG. 14) may transmit a first signal using a modulation signature associated with a reconfigurable intelligent surface (RIS) or a repeater, wherein the RIS or the repeater redirects the first signal and reverses the modulation signature, as described above.

As further shown in FIG. 11, in some aspects, process 1100 may include transmitting a second signal without using the modulation signature associated with the RIS or the repeater (block 1120). For example, the base station (e.g., using communication manager 150 and/or transmission component 1404, depicted in FIG. 14) may transmit a second signal without using the modulation signature associated with the RIS or the repeater, as described above.

Process 1100 may include additional aspects, such as any single aspect or any combination of aspects described below and/or in connection with one or more other processes described elsewhere herein.

In a first aspect, the first signal is undecodable by a user equipment (UE) before being redirected by the RIS or the repeater.

In a second aspect, alone or in combination with the first aspect, transmitting the first signal includes transmitting the first signal in a first beam direction associated with the RIS or the repeater, and transmitting the second signal includes transmitting the second signal in the first beam direction or in a second beam direction that satisfies a distance threshold with respect to the first beam direction.

In a third aspect, alone or in combination with one or more of the first and second aspects, the second signal is decodable by a user equipment (UE) without being redirected by the RIS or the repeater, and the first signal is decodable by the UE after the RIS or the repeater redirects the first signal and reverses the modulation signature.

In a fourth aspect, alone or in combination with one or more of the first through third aspects, the RIS or the repeater redirects the second signal and applies an inverse modulation associated with the modulation signature to the second signal, and the second signal is undecodable by the UE after the RIS or the repeater applies the inverse modulation associated with the modulation signature to the second signal.

In a fifth aspect, alone or in combination with one or more of the first through fourth aspects, the modulation signature is at least one of a frequency modulation signature, a phase modulation signature, a polarization modulation signature, or an amplitude modulation signature.

In a sixth aspect, alone or in combination with one or more of the first through fifth aspects, the modulation signature is a frequency modulation signature, and transmitting a first signal using a modulation signature associated with the RIS or the repeater includes applying a frequency shift to the first signal, the frequency shift is associated with the RIS or the repeater.

In a seventh aspect, alone or in combination with one or more of the first through sixth aspects, the modulation signature is a phase modulation signature, and transmitting a first signal using a modulation signature associated with the RIS or the repeater includes applying a time-domain phase shift pattern to the first signal, the time-domain phase shift pattern is associated with the RIS or the repeater.

In an eighth aspect, alone or in combination with one or more of the first through seventh aspects, transmitting the first signal includes transmitting one or more first synchronization signal blocks (SSBs) associated with the RIS or the repeater in a first beam direction using the modulation signature associated with the RIS or the repeater, and transmitting the second signal includes transmitting one or more second SSBs not associated with the RIS or the repeater without using the modulation signature.

In a ninth aspect, alone or in combination with one or more of the first through eighth aspects, transmitting the one or more second SSBs includes transmitting a second SSB of the one or more second SSBs in the first beam direction or in a second beam direction that satisfies a distance threshold with respect to the first beam direction.

In a tenth aspect, alone or in combination with one or more of the first through ninth aspects, the one or more first SSBs are associated with first system information, and the one or more second SSBs are associated with second system information that is different from the first system information.

In an eleventh aspect, alone or in combination with one or more of the first through tenth aspects, the first signal is associated with a first operator and the second signal is associated with a second operator.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
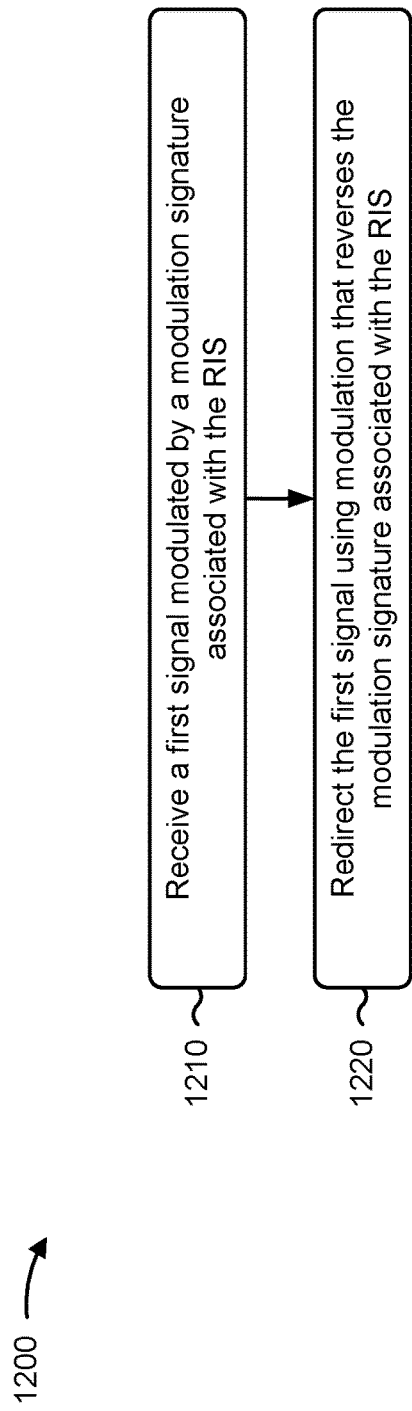

FIG. 12 is a diagram illustrating an example process 1200 performed, for example, by an RIS, in accordance with the present disclosure. Example process 1200 is an example where the RIS (e.g., RIS 750) performs operations associated with efficient RIS-assisted communication.

As shown in FIG. 12, in some aspects, process 1200 may include receiving, from a base station, a first signal modulated by a modulation signature associated with the RIS (block 1210). For example, the RIS (e.g., using communication manager 170 and/or reception component 1502, depicted in FIG. 15) may receive, from a base station, a first signal modulated by a modulation signature associated with the RIS, as described above.

As further shown in FIG. 12, in some aspects, process 1200 may include redirecting the first signal using modulation that reverses the modulation signature associated with the RIS (block 1220). For example, the RIS (e.g., using communication manager 170, reflection component 1508, and/or modulation component 1510, depicted in FIG. 15) may redirect the first signal using modulation that reverses the modulation signature associated with the RIS, as described above.

Process 1200 may include additional aspects, such as any single aspect or any combination of aspects described below and/or in connection with one or more other processes described elsewhere herein.

In a first aspect, the first signal is decodable by a UE based at least in part on the first signal being redirected using the modulation that reverses the modulation signature associated with the RIS.

In a second aspect, alone or in combination with the first aspect, the modulation signature is at least one of a frequency modulation signature, a phase modulation signature, a polarization modulation signature, or an amplitude modulation signature.

In a third aspect, alone or in combination with one or more of the first and second aspects, redirecting the first signal using modulation that reverses the modulation signature associated with the RIS includes modulating the first signal using an inverse modulation pattern associated with the modulation signature.

In a fourth aspect, alone or in combination with one or more of the first through third aspects, process 1200 includes receiving, from the base station, an indication of at least one of the modulation signature associated with the RIS or the inverse modulation pattern associated with the modulation signature.

In a fifth aspect, alone or in combination with one or more of the first through fourth aspects, process 1200 includes receiving, from the base station, a second signal that is not modulated by the modulation signature associated with the RIS, and redirecting the second signal and modulating the second signal using the inverse modulation pattern associated with the modulation signature.

In a sixth aspect, alone or in combination with one or more of the first through fifth aspects, the second signal is undecodable by a UE after being modulated by the RIS using the inverse modulation associated with the modulation signature.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
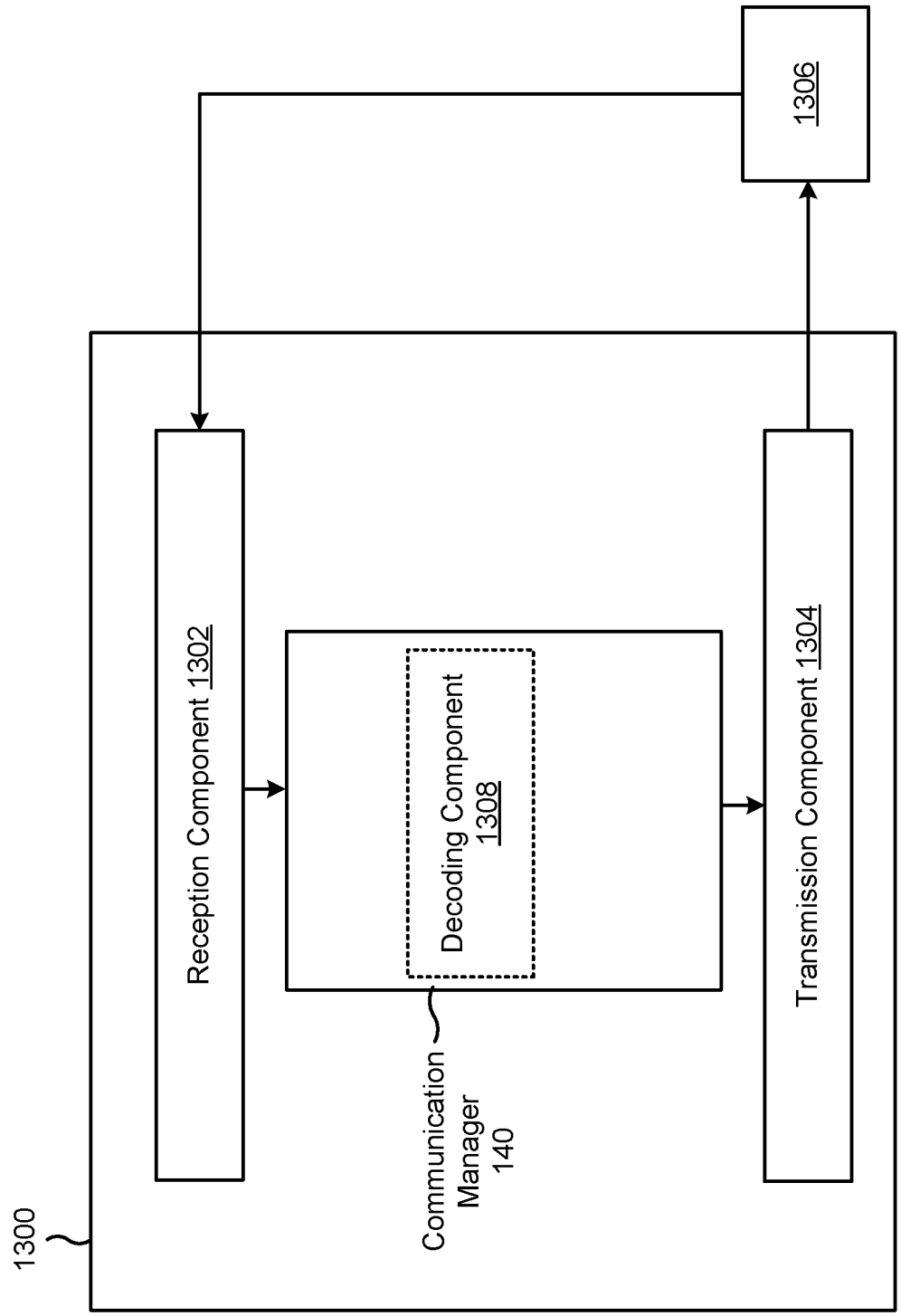

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include a decoding component 1308, among other examples.

In some aspects, the apparatus 1300 may be configured to perform one or more operations described herein in connection with FIGS. 7-9. Additionally, or alternatively, the apparatus 1300 may be configured to perform one or more processes described herein, such as process 1000 of FIG. 10, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive a signal that is transmitted by a base station with a modulation signature associated with an RIS or a repeater and redirected by the RIS or the repeater using modulation that reverses the modulation signature associated with the RIS or the repeater. The decoding component 1308 may decode the signal, wherein the signal is decodable by the UE based at least in part on the signal being redirected by the RIS or the repeater using the modulation that reverses the modulation signature associated with the RIS or the repeater.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
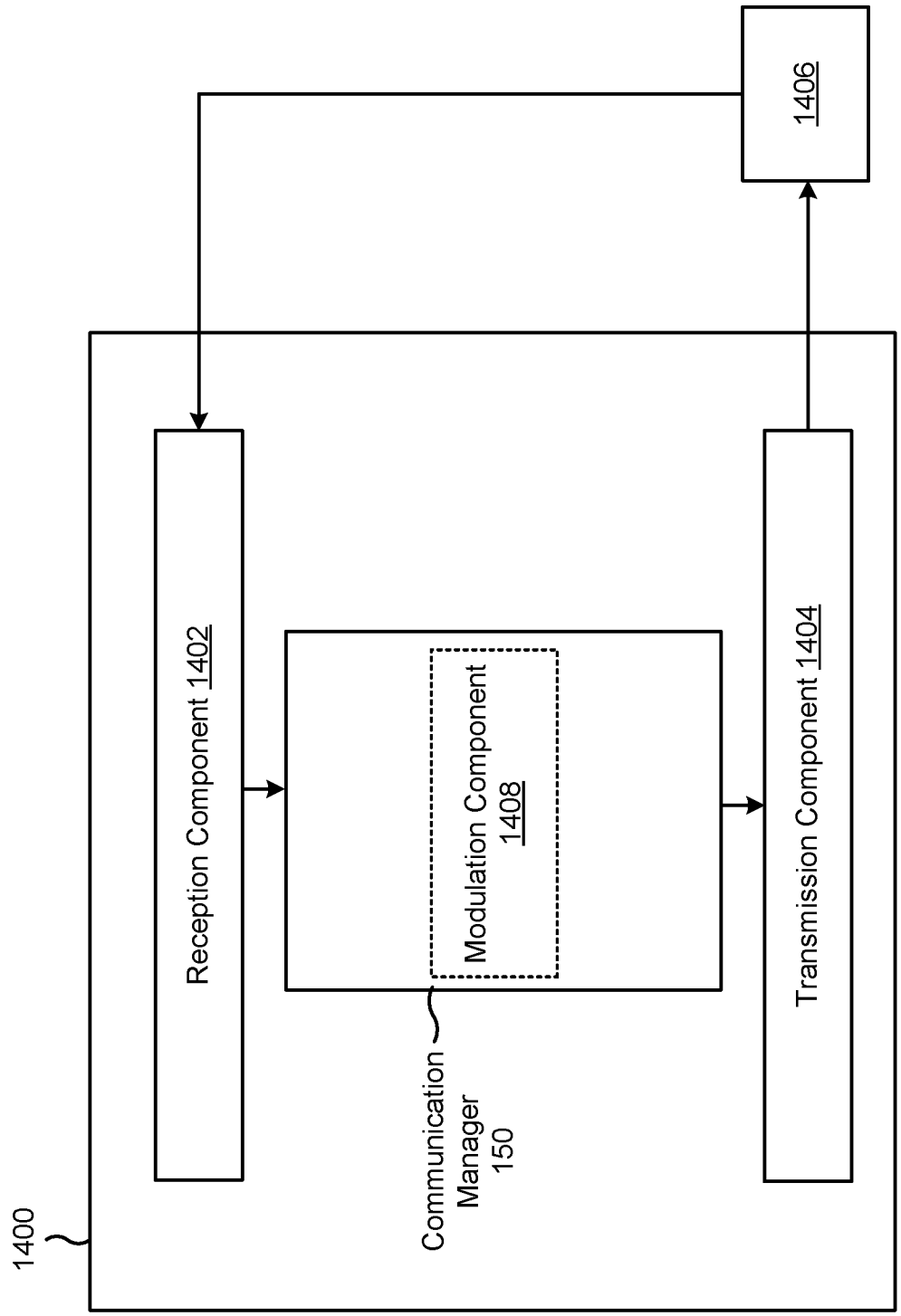

FIG. 14 is a diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include a modulation component 1408, among other examples.

In some aspects, the apparatus 1400 may be configured to perform one or more operations described herein in connection with FIGS. 7-9. Additionally, or alternatively, the apparatus 1400 may be configured to perform one or more processes described herein, such as process 1100 of FIG. 11, or a combination thereof. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The transmission component 1404 may transmit a first signal using a modulation signature associated with a reconfigurable intelligent surface (RIS) or a repeater, wherein the RIS or the repeater redirects the first signal and reverses the modulation signature. The transmission component 1404 may transmit a second signal without using the modulation signature associated with the RIS or the repeater.

The modulation component 1408 may modulated the first signal using the modulation signature.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

FIG. 15 is a diagram of an example apparatus 1500 for wireless communication. The apparatus 1500 may be an RIS, or an RIS may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 170. The communication manager 170) may include one or more of a reflection component 1508 and/or a modulation component 1510, among other examples.

In some aspects, the apparatus 1500 may be configured to perform one or more operations described herein in connection with FIGS. 7-9. Additionally, or alternatively, the apparatus 1500 may be configured to perform one or more processes described herein, such as process 1200 of FIG. 12, or a combination thereof. In some aspects, the apparatus 1500 and/or one or more components shown in FIG. 15 may include one or more components of the RIS described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the RIS described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the RIS described in connection with FIG. 2. In some aspects, the transmission component 1504 may be co-located with the reception component 1502 in a transceiver.

The reception component 1502 may receive, from a base station, a first signal modulated by a modulation signature associated with the RIS. The reflection component 1508 and/or the modulation component 1510 may redirect the first signal using modulation that reverses the modulation signature associated with the RIS.

The reception component 1502 may receive, from the base station, an indication of at least one of the modulation signature associated with the RIS or the inverse modulation pattern associated with the modulation signature.

The reception component 1502 may receive, from the base station, a second signal that is not modulated by the modulation signature associated with the RIS.

The reflection component 1508 may redirect the second signal and the modulation component 1510 may modulate the second signal using the inverse modulation pattern associated with the modulation signature.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving a signal that is transmitted by a base station with a modulation signature associated with a reconfigurable intelligent surface (RIS) or a repeater and redirected by the RIS or the repeater using modulation that reverses the modulation signature associated with the RIS or the repeater; and decoding the signal, wherein the signal is decodable by the UE based at least in part on the signal being redirected by the RIS or the repeater using the modulation that reverses the modulation signature associated with the RIS or the repeater.

Aspect 2: The method of Aspect 1, wherein the signal is undecodable by the UE before being redirected by the RIS or the repeater using the modulation that reverses the modulation signature associated with the RIS or the repeater.

Aspect 3: The method of any of Aspects 1-2, wherein decoding the signal comprises: decoding the signal in connection with a determination that the signal is decodable by the UE, wherein the determination that the signal is decodable by the UE is based at least in part on a measurement of the signal.

Aspect 4: The method of any of Aspects 1-3, wherein the signal includes a synchronization signal block (SSB) associated with the RIS or the repeater.

Aspect 5: The method of Aspect 4, wherein system information associated with the SSB block is different from system information associated with one or more other SSBs that are not associated with the RIS or the repeater.

Aspect 6: The method of any of Aspects 1-5, wherein the modulation signature is at least one of a frequency modulation signature, a phase modulation signature, a polarization modulation signature, or an amplitude modulation signature.

Aspect 7: A method of wireless communication performed by a base station, comprising: transmitting a first signal using a modulation signature associated with a reconfigurable intelligent surface (RIS) or a repeater, wherein the RIS or the repeater redirects the first signal and reverses the modulation signature; and transmitting a second signal without using the modulation signature associated with the RIS or the repeater.

Aspect 8: The method of Aspect 7, wherein the first signal is undecodable by a user equipment (UE) before being redirected by the RIS or the repeater.

Aspect 9: The method of any of Aspects 7-8, wherein transmitting the first signal comprises transmitting the first signal in a first beam direction associated with the RIS or the repeater, and wherein transmitting the second signal comprises transmitting the second signal in the first beam direction or in a second beam direction that satisfies a distance threshold with respect to the first beam direction.

Aspect 10: The method of Aspect 9, wherein the second signal is decodable by a user equipment (UE) without being redirected by the RIS or the repeater, and wherein the first signal is decodable by the UE after the RIS or the repeater redirects the first signal and reverses the modulation signature.

Aspect 11: The method of Aspect 10, wherein the RIS or the repeater redirects the second signal and applies an inverse modulation associated with the modulation signature to the second signal, and wherein the second signal is undecodable by the UE after the RIS or the repeater applies the inverse modulation associated with the modulation signature to the second signal.

Aspect 12: The method of any of Aspects 7-11, wherein the modulation signature is at least one of a frequency modulation signature, a phase modulation signature, a polarization modulation signature, or an amplitude modulation signature.

Aspect 13: The method of any of Aspects 7-12, wherein the modulation signature is a frequency modulation signature, and wherein transmitting a first signal using a modulation signature associated with the RIS or the repeater comprises: applying a frequency shift to the first signal, wherein the frequency shift is associated with the RIS or the repeater.

Aspect 14: The method of any of Aspects 7-13, wherein the modulation signature is a phase modulation signature, and wherein transmitting a first signal using a modulation signature associated with the RIS or the repeater comprises: applying a time-domain phase shift pattern to the first signal, wherein the time-domain phase shift pattern is associated with the RIS or the repeater.

Aspect 15: The method of any of Aspects 7-14, wherein transmitting the first signal comprises transmitting one or more first synchronization signal blocks (SSBs) associated with the RIS or the repeater in a first beam direction using the modulation signature associated with the RIS or the repeater, and wherein transmitting the second signal comprises transmitting one or more second SSBs not associated with the RIS or the repeater without using the modulation signature.

Aspect 16: The method of Aspect 15, wherein transmitting the one or more second SSBs comprises: transmitting a second SSB of the one or more second SSBs in the first beam direction or in a second beam direction that satisfies a distance threshold with respect to the first beam direction.

Aspect 17: The method of any of Aspects 15-16, wherein the one or more first SSBs are associated with first system information, and wherein the one or more second SSBs are associated with second system information that is different from the first system information.

Aspect 18: The method of any of Aspects 7-17, wherein the first signal is associated with a first operator and the second signal is associated with a second operator.

Aspect 19: A method of wireless communication performed by a reconfigurable intelligent surface (RIS), comprising: receiving, from a base station, a first signal modulated by a modulation signature associated with the RIS; and redirecting the first signal using modulation that reverses the modulation signature associated with the RIS.

Aspect 20: The method of Aspect 19, wherein the first signal is decodable by a user equipment (UE) based at least in part on the first signal being redirected using the modulation that reverses the modulation signature associated with the RIS.

Aspect 21: The method of any of Aspects 19-20, wherein the modulation signature is at least one of a frequency modulation signature, a phase modulation signature, a polarization modulation signature, or an amplitude modulation signature.

Aspect 22: The method of any of Aspects 19-21, wherein redirecting the first signal using modulation that reverses the modulation signature associated with the RIS comprises: modulating the first signal using an inverse modulation pattern associated with the modulation signature.

Aspect 23: The method of Aspect 22, further comprising: receiving, from the base station, an indication of at least one of the modulation signature associated with the RIS or the inverse modulation pattern associated with the modulation signature.

Aspect 24: The method of any of Aspects 22-23, further comprising: receiving, from the base station, a second signal that is not modulated by the modulation signature associated with the RIS; and redirecting the second signal and modulating the second signal using the inverse modulation pattern associated with the modulation signature.

Aspect 25: The method of Aspect 24, wherein the second signal is undecodable by a UE after being modulated by the RIS using the inverse modulation associated with the modulation signature.

Aspect 26: An apparatus for wireless communication at a device, comprising a processor; memory coupled with the processor; and instructions stored in the memory and executable by the processor to cause the apparatus to perform the method of one or more of Aspects 1-6.

Aspect 27: A device for wireless communication, comprising a memory and one or more processors coupled to the memory, the one or more processors configured to perform the method of one or more of Aspects 1-6.

Aspect 28: An apparatus for wireless communication, comprising at least one means for performing the method of one or more of Aspects 1-6.

Aspect 29: A non-transitory computer-readable medium storing code for wireless communication, the code comprising instructions executable by a processor to perform the method of one or more of Aspects 1-6.

Aspect 30: A non-transitory computer-readable medium storing a set of instructions for wireless communication, the set of instructions comprising one or more instructions that, when executed by one or more processors of a device, cause the device to perform the method of one or more of Aspects 1-6.

Aspect 31: An apparatus for wireless communication at a device, comprising a processor; memory coupled with the processor; and instructions stored in the memory and executable by the processor to cause the apparatus to perform the method of one or more of Aspects 7-18.

Aspect 32: A device for wireless communication, comprising a memory and one or more processors coupled to the memory, the one or more processors configured to perform the method of one or more of Aspects 7-18.

Aspect 33: An apparatus for wireless communication, comprising at least one means for performing the method of one or more of Aspects 7-18.

Aspect 34: A non-transitory computer-readable medium storing code for wireless communication, the code comprising instructions executable by a processor to perform the method of one or more of Aspects 7-18.

Aspect 35: A non-transitory computer-readable medium storing a set of instructions for wireless communication, the set of instructions comprising one or more instructions that, when executed by one or more processors of a device, cause the device to perform the method of one or more of Aspects 7-18.

Aspect 36: An apparatus for wireless communication at a device, comprising a processor; memory coupled with the processor; and instructions stored in the memory and executable by the processor to cause the apparatus to perform the method of one or more of Aspects 19-25.

Aspect 37: A device for wireless communication, comprising a memory and one or more processors coupled to the memory, the one or more processors configured to perform the method of one or more of Aspects 19-25.

Aspect 38: An apparatus for wireless communication, comprising at least one means for performing the method of one or more of Aspects 19-25.

Aspect 39: A non-transitory computer-readable medium storing code for wireless communication, the code comprising instructions executable by a processor to perform the method of one or more of Aspects 19-25.

Aspect 40: A non-transitory computer-readable medium storing a set of instructions for wireless communication, the set of instructions comprising one or more instructions that, when executed by one or more processors of a device, cause the device to perform the method of one or more of Aspects 19-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive a signal that is transmitted by a network entity as a scrambled signal with a modulation signature associated with a reconfigurable intelligent surface (RIS), the signal being received based at least in part on the scrambled signal being redirected by the RIS using modulation that reverses the modulation signature associated with the RIS to unscramble the signal to be decodable by the UE; and
decode the signal, wherein the signal is decodable by the UE based at least in part on the signal being redirected by the RIS using the modulation that reverses the modulation signature associated with the RIS.

2. The UE of claim 1, wherein the signal is undecodable by the UE before being redirected by the RIS using the modulation that reverses the modulation signature associated with the RIS.

3. The UE of claim 1, wherein the one or more processors, to decode the signal, are configured to:
decode the signal in connection with a determination that the signal is decodable by the UE, wherein the determination that the signal is decodable by the UE is based at least in part on a measurement of the signal.

4. The UE of claim 1, wherein the signal includes a synchronization signal block (SSB) associated with the RIS.

5. The UE of claim 4, wherein system information associated with the SSB is different from system information associated with one or more other SSBs that are not associated with the RIS.

6. The UE of claim 1, wherein the modulation signature is at least one of a frequency modulation signature, a phase modulation signature, a polarization modulation signature, or an amplitude modulation signature.

7. A network entity for wireless communication, comprising:
one or more memories; and
one or more processors, coupled to the one or more memories, configured to:
transmit a first signal as a scrambled signal using a modulation signature associated with a reconfigurable intelligent surface (RIS), wherein the RIS redirects the first signal and reverses the modulation signature to unscramble the signal to be decodable by a user equipment (UE); and
transmit a second signal without using the modulation signature associated with the RIS.

8. The network entity of claim 7, wherein the first signal is undecodable by the UE before being redirected by the RIS.

9. The network entity of claim 7, wherein the one or more processors, to transmit the first signal, are configured to transmit the first signal in a first beam direction associated with the RIS, and wherein the one or more processors, to transmit the second signal, are configured to transmit the second signal in the first beam direction or in a second beam direction that satisfies a distance threshold with respect to the first beam direction.

10. The network entity of claim 9, wherein the second signal is decodable by the UE without being redirected by the RIS, and wherein the first signal is decodable by the UE after the RIS redirects the first signal and reverses the modulation signature.

11. The network entity of claim 10, wherein the RIS redirects the second signal and applies an inverse modulation associated with the modulation signature to the second signal, and wherein the second signal is undecodable by the UE after the RIS applies the inverse modulation associated with the modulation signature to the second signal.

12. The network entity of claim 7, wherein the modulation signature is at least one of a frequency modulation signature, a phase modulation signature, a polarization modulation signature, or an amplitude modulation signature.

13. The network entity of claim 7, wherein the modulation signature is a frequency modulation signature, and wherein the one or more processors, to transmit a first signal using a modulation signature associated with the RIS, are configured to:
apply a frequency shift to the first signal, wherein the frequency shift is associated with the RIS.

14. The network entity of claim 7, wherein the modulation signature is a phase modulation signature, and wherein the one or more processors, to transmit a first signal using a modulation signature associated with the RIS, are configured to:
apply a time-domain phase shift pattern to the first signal, wherein the time-domain phase shift pattern is associated with the RIS.

15. The network entity of claim 7, wherein the one or more processors, to transmit the first signal, are configured to transmit one or more first synchronization signal blocks (SSBs) associated with the RIS in a first beam direction using the modulation signature associated with the RIS, and wherein the one or more processors, to transmit the second signal, are configured to transmit one or more second SSBs not associated with the RIS without using the modulation signature.

16. The network entity of claim 15, wherein the one or more processors, to transmit the one or more second SSBs, are configured to:
transmit a second SSB of the one or more second SSBs in the first beam direction or in a second beam direction that satisfies a distance threshold with respect to the first beam direction.

17. The network entity of claim 15, wherein the one or more first SSBs are associated with first system information, and wherein the one or more second SSBs are associated with second system information that is different from the first system information.

18. The network entity of claim 7, wherein the first signal is associated with a first operator and the second signal is associated with a second operator.

19. A method of wireless communication performed by a user equipment (UE), comprising:
    receiving a signal that is transmitted by a network entity as a scrambled signal with a modulation signature associated with a reconfigurable intelligent surface (RIS), the signal being received based at least in part on the scrambled signal being redirected by the RIS using modulation that reverses the modulation signature associated with the RIS to unscramble the signal to be decodable by the UE; and
    decoding the signal, wherein the signal is decodable by the UE based at least in part on the signal being redirected by the RIS using the modulation that reverses the modulation signature associated with the RIS.

20. The method of claim 19, wherein the signal is undecodable by the UE before being redirected by the RIS using the modulation that reverses the modulation signature associated with the RIS.

21. The method of claim 19, wherein decoding the signal comprises:
    decoding the signal in connection with a determination that the signal is decodable by the UE, wherein the determination that the signal is decodable by the UE is based at least in part on a measurement of the signal.

22. The method of claim 19, wherein the signal includes a synchronization signal block (SSB) associated with the RIS.

23. The method of claim 22, wherein system information associated with the SSB is different from system information associated with one or more other SSBs that are not associated with the RIS.

24. The method of claim 19, wherein the modulation signature is at least one of a frequency modulation signature, a phase modulation signature, a polarization modulation signature, or an amplitude modulation signature.

25. A method of wireless communication performed by a network entity, comprising:
    transmitting a first signal as a scrambled signal using a modulation signature associated with a reconfigurable intelligent surface (RIS), wherein the RIS redirects the first signal and reverses the modulation signature to unscramble the signal to be decodable by a user equipment (UE); and
    transmitting a second signal without using the modulation signature associated with the MS.

26. The method of claim 25, wherein transmitting the first signal comprises transmitting the first signal in a first beam direction associated with the RIS, and wherein transmitting the second signal comprises transmitting the second signal in the first beam direction or in a second beam direction that satisfies a distance threshold with respect to the first beam direction.

27. The method of claim 26, wherein the second signal is decodable by the UE without being redirected by the RIS, and wherein the first signal is decodable by the UE after the MS redirects the first signal and reverses the modulation signature.

28. The method of claim 27, wherein the MS redirects the second signal and applies an inverse modulation associated with the modulation signature to the second signal, and wherein the second signal is undecodable by the UE after the MS applies the inverse modulation associated with the modulation signature to the second signal.

29. The method of claim 25, wherein the modulation signature is at least one of a frequency modulation signature, a phase modulation signature, a polarization modulation signature, or an amplitude modulation signature.

30. The method of claim 25, wherein transmitting the first signal comprises transmitting one or more first synchronization signal blocks (SSBs) associated with the RIS in a first beam direction using the modulation signature associated with the RIS, and wherein transmitting the second signal comprises transmitting one or more second SSBs not associated with the RIS without using the modulation signature.

* * * * *